(12) United States Patent
Bullitt et al.

(10) Patent No.: US 8,090,164 B2
(45) Date of Patent: Jan. 3, 2012

(54) SYSTEMS, METHODS, AND COMPUTER PROGRAM PRODUCTS FOR ANALYSIS OF VESSEL ATTRIBUTES FOR DIAGNOSIS, DISEASE STAGING, AND SURGICAL PLANNING

(75) Inventors: Elizabeth Bullitt, Durham, NC (US); Stephen Aylward, Carrboro, NC (US)

(73) Assignee: The University of North Carolina at Chapel Hill, Chapel Hill, NC (US)

(*) Notice: Subject to any disclaimer, the term of this patent is extended or adjusted under 35 U.S.C. 154(b) by 1148 days.

(21) Appl. No.: 10/569,436

(22) PCT Filed: Jul. 16, 2004

(86) PCT No.: PCT/US2004/022955
§ 371 (c)(1),
(2), (4) Date: Sep. 1, 2006

(87) PCT Pub. No.: WO2005/023086
PCT Pub. Date: Mar. 17, 2005

(65) Prior Publication Data
US 2007/0019846 A1    Jan. 25, 2007

Related U.S. Application Data

(60) Provisional application No. 60/497,656, filed on Aug. 25, 2003.

(51) Int. Cl.
*G06K 9/00* (2006.01)
(52) U.S. Cl. ...................................................... 382/128
(58) Field of Classification Search .......... 382/128–134; 128/920–930; 250/455–465; 356/39–49; 600/407–414, 424–426
See application file for complete search history.

(56) References Cited

U.S. PATENT DOCUMENTS 5,438,989 A * 8/1995 Hochman et al. ............. 600/426
5,768,405 A   6/1998 Makram-Ebeid
(Continued)

FOREIGN PATENT DOCUMENTS
WO    WO 2006/036842 A2    4/2006

OTHER PUBLICATIONS

Alexander S. Houston, "Jackknifing a normal database for regional cerebral blood flow SPECT obtained using principal components", 1997, Information Processing in Medical Imaging. 15th International Conference, IPMI'97. Proceedings, 1997, p. 299-312, 16 refs, pp. xvi +557, ISBN: 3-540-63046-5. Publisher: Springer-Verlag, Berlin, Germany.*

(Continued)

*Primary Examiner* — Atiba O Fitzpatrick
(74) *Attorney, Agent, or Firm* — Jenkins, Wilson, Taylor & Hunt, P.A.

(57) ABSTRACT

Systems, methods, and computer program products for analysis of vessel attributes for diagnosis, disease staging, and surgical planning are disclosed. A method for analyzing blood vessel attributes may include developing an atlas including statistical measures for at least one blood vessel attribute. The statistical measures can be developed from blood vessel image data from different individuals. Blood vessel attribute measurements can be obtained from an individual subject. The individual subject's blood vessel attribute measurements can be compared to the statistical measures in the atlas. Output may be produced indicative of a physical characteristic of the individual based on results from the comparison.

56 Claims, 19 Drawing Sheets

U.S. PATENT DOCUMENTS

| | | | |
|---|---|---|---|
| 5,787,185 A | 7/1998 | Clayden | |
| 5,835,189 A * | 11/1998 | Quigley et al. | 351/206 |
| 6,169,917 B1 | 1/2001 | Masotti et al. | |
| 6,173,068 B1 | 1/2001 | Prokoski | |
| 6,443,894 B1 | 9/2002 | Sumanaweera et al. | |
| 6,563,941 B1 | 5/2003 | O'Donnell et al. | |
| 6,581,011 B1 * | 6/2003 | Johnson et al. | 702/19 |
| 6,690,816 B2 | 2/2004 | Aylward et al. | |
| 6,711,433 B1 | 3/2004 | Geiger et al. | |
| 2001/0036302 A1 | 11/2001 | Miller | |
| 2002/0086347 A1 | 7/2002 | Johnson et al. | |
| 2002/0106116 A1 | 8/2002 | Knoplioch et al. | |
| 2002/0118875 A1 | 8/2002 | Wilensky | |
| 2002/0136440 A1 | 9/2002 | Yim et al. | |
| 2003/0208116 A1 * | 11/2003 | Liang et al. | 600/407 |
| 2004/0210124 A1 * | 10/2004 | Nowinski et al. | 600/407 |
| 2008/0247622 A1 | 10/2008 | Aylward et al. | |

OTHER PUBLICATIONS

Notification of Transmittal of the International Search Report and the Written Opinion of the International Searching Authority, or the Declaration for International Application No. PCT/US04/22955 (Feb. 11, 2005).

Alazzaz et al., Intracranial percutaneous transluminal angioplasty for arteriosclerotic stenosis, Arch. Neurol., vol. 57, pp. 1625-1630 (2000).

Alperin et al., "Retrospective Registration of X-ray Angiograms with MR Images by Using Vessels as Intrinsic Landmarks," Journal of Magnetic Resonance Imaging, 4: pp. 139-144 (1994.

Amunts et al., "Advances in Cytoarchitectonic Mapping of the Human Cerebral Cortex," Neuroimaging Clinics of North America, vol. 11, No. 2, pp. 151-169 (May 2001).

Aylward et al., "Analysis of the parameter space of a metric for registering 3D vascular images," MICCAI 2001; Lecture Notes in Computer Science, vol. 2208, pp. 932-939 (2001).

Aylward et al., "Initialization, Noise, Singularities, and Scale in Height Ridge Traversal for Tubular Object Centerline Extractin," IEEE Transactions on Medical Imaging, vol. 21, No. 2, pp. 61-75 (2002).

Aylward et al., "Intensity Ridge and Widths for Tubular Object Segmentaton and Description," IEEE Workshop on Mathematical Methods inBiomedical Image Analysis, pp. 131-138 (1996).

Aylward et al., "Registration and Analysis of Vascular Images," International Journal of Computer Vision, vol. 55, No. 3, pp. 123-138 (Nov. 2003).

Ballard, "Generalizing the Hough transform to detect arbitrary shapes," Pattern Recognition, vol. 13, No. 2, pp. 111-122 (1981).

Bénard et al., "Imaging Gliomas with Positron Tomography and Single-Photon Emission Computed Tomography," Seminars in Nuclear Medicine, vol. 33, pp. 148-162 (Apr. 2003).

Besl et al., "A method for registration of 3-D shapes" IEEE Trans. Pattern Anal. Mach. Intell, 14, 1992, pp. 239-256 (1992).

Bracher, "Changes in Peripapillary Tortuosityof the Central Retinal Arteries in Newborns," Graefe's Arch Clin Exp Opthalmol, vol. 218, pp. 211-217 (1982).

Brubaker et al., "The Use of Diffusion Tensor Imaging to Evaluate Demyelination Processes in Mice," Abstract, RSNA (2003).

Bullitt et al., "Analyzing attributes of vessel populations," Submitted MedIA, (2003b).

Bullitt et al., "Measuring tortuosity of the intracerebral vasculature from MRA images," IEEE TMI (2003a).

Bullitt et al., "Vascular Attributes and Malignant Brain Tumors," Accepted MICCAI 2003 (2003).

Bullitt, "Volume Rendering of Segmented Image Objects," IEEE-TMI, vol. 21, pp. 998-1002 (2002).

Bullitt et al., "Symbolic Description of Intracerebral Vessels Segmented from Magnetic Resonance Angiograms and Evaluation by Comparison with X-Ray Angiograms," Medical Image Analysis, vol. 5, pp. 157-169 (2001).

Bullitt et al., "Computer-assisted visualization of arteriovenous malformations on the home pc." Neurosurgery: 48: 2001, pp. 576-583 (2001).

Bullitt et al., "Registration of 3D Cerebral Vessels with 2D Digital Angiograms: Clinical Evaluation," Academic Radiology, vol. 6, No. 9, pp. 539-546 (Sep. 1999).

Bullitt et al., "3D Graph Description of the Intracerebral Vasculature from Segmented MRA and Tests of Accuracy By Comparison with X-ray Angiograms," IPMI'99, Lecture Notes in Computer Science, vol. 1613, pp. 308-321 (1999).

Bullitt et al., "Methods for displaying intracerebral vascular anatomy," American Journal of Neuroradiology, vol. 18, pp. 417-420 (1997a).

Bullitt et al. "Three dimensional reconstruction of curves from pairs of projection views in the presence of error. I. Algorithms," Am. Assoc. Phys. Med. vol. 24, No. 11, pp. 1671-1678 (Nov. 1997).

Bullitt et al., "Three dimensional reconstruction of curves from pairs of Analysis of error. II Analysis of error," Am. Assoc. Phys. Med. vol. 24, No. 11, pp. 1679-1687 (Nov. 1997).

Bullitt et al., "Three-dimensional reconstruction of intracranial vessels from biplane projection views," Journal of Neurosciience Methods, vol. 66, pp. 13-22 (1996).

Capowski et al., "A Numeric Index Based on Spatial Frequency for the Tortuosity of Retinal Vessels and its Application to Plus Disease in Retinopathy of Prematurity," Retina, vol. 15, pp. 490-500 (1995).

Chillet et al., "Vascular atlas formation using a vessel-to-image affine registration method," MICCAI 2003 (2003).

Christoforidis et al., "Visualization of Microvascularity in Glioblastoma Multiforme with 8T High-Spatial Resolution MR Imaging," AJNR, vol. 23, pp. 1553-1556 (Oct. 2000).

Chui et al., "A Unified Feature Registration Method for Brain Mapping." Information Processing in Medical Imaging, pp. 300-314 (2001).

Chung et al., "Statistical 3D Vessel Segmentation using a Rician Distribution," MICCAI '99, Lecture Notes in Computer Science, vol. 1679, pp. 82-89 (1999).

Collignon et al., "Automated multi-modality image registration based on information therory," Information Processing in Medical Imaging 1995 ed Y Bizais, C Barrillot and R Di Paola (Dordrecht: Kluwer Academic, pp. 263-274 (1995).

Cool et al., "Tissue-based affine registration of brain images to form a vascular density atlas," MICCAI 2003.

Cootes et al., "The use of active shape models for locating structures inmedical images," Information Processing in Medical Imaging, Lecture Notes in Computer Science, vol. 687, pp. 33-47 (1993).

Cramer et al., "Mapping Individual Brains to Guide Restorative Therapy after Stoke: Rational and Pilot Studies," Neurological Research, vol. 25, pp. 811-814 (Dec. 2003).

Damon, "Determining the Geometry of the Boundaries of Objects from Medial Data," International Journal of Computer Vision, vol. 6, No. 1, pp. 45-64 (2005).

Danielsson, "Euclidean Distance Mapping," Computer Graphics and Image Processing, vol. 14, pp. 227-248 (1980).

De Bruijne et al., "Active Shape Model Based Segmentation of Abdominal Aortic Aneurysms in CTA Images," Proceedings of SPIE, vol. 4684, pp. 463-474 (2002).

Du et al., "Vessel Enhancement Filtering in Three-dimensional MR Angiography," Journal of Magnetic Resonance Imaging, 5:353-359 (1995).

Feldmar et al., "Matching 3D MR Angiography Data and 2D X-ray Angiograms," Lect Notes Comp Sci, vol. 1205, pp. 129-138 (1997).

Frangi et al., "Quantification of Vessel Morphology from 3D MRA," MICCAI '99, LNCS, 1679, pp. 358-368 (1999).

Gerig et al., "Symbolic description of 3-D structures applied ot cerebral vessel tree obtained from MR angiography volume data," IMPI 1993, Lect. Notes Comp. Sci., Berlin, germany: Springer, vol. 687, pp. 94-111 (1993).

Goldbaum et al., "Automated Measures of Retinal Blood Vessel Tortuosity," Investigative Ophthalmology & Visual Science, vol. 35, No. 4, p. 2089 (Mar. 15, 1994).

Guyon et al., "VETOT, Volume Estimation and Tracking Over Time: Framework andValidation," MICCAI 2003, LNCS 2879, pp. 142-149 (Mar. 2003).

Hart et al., "Measurement in Classification of Retinal Vascular Tortuosity," International Journal of Medical Informatics, vol. 53, pp. 239-252 (1999).

Ho et al., "Level set evolution with region competition: Automatic 3D segmentation fo brain tumors," Proc. 16th Int Conf on Pattern Recognition, IEEE Computer Society, pp. 532-535 (2002).

Holland, "Animal models of cell cycle dysregulation and the pathogenesis of gliomas," Journal of Neuro-Oncology, vol. 51, pp. 265-276 (2001).

Holland, "Brain tumor animal models: Importance and progress," Curr Opin Oncol., vol. 13, pp. 143-147 (2001).

Hoogeveen et al., "Limits to the Accuracy of Vessell Diameter Measurement in MR Angiography," Journal of Magnetic Resonance Imaging, 8: 1228-1235 (1998).

Ibanez et al., "Registration Patterns: The Generic Framework for Image Registration of the Insight Toolkit," IEEE International Symposium on Biomedical Imaging, pp. 345-348 (2002).

Jain, "Normalizing Tumor Vasculature with Anti-Angogenic Therapy: A New Paradigm for Combination Therapy," Natgure Medicine, vol. 7, pp. 987-989 (Sep. 2001).

Kahn et al., "Diagnosis of Recurrent Brain Tumor: Value of 201T1 SPECT vs 18F-flurodeoxyglucose PET," AJR, vol. 163, pp. 1459-1465 (1994).

Kaufman et al., "Diagnostic Brain Biopsy," Wilkins RH, Rengachery SS (eds.) Neurosurgery, McGraw-Hill, New York, pp. 289-294 (1985).

Kitamoto et al., "Vascular Endothelial Groth Factor is an Essential Molecule for Mouse Kidney Development: Glomerulogenesis and Nephrogenesis," Journal of Clinical Investigation, vol. 99, pp. 2351-2357 (1997).

Koenderink, "Solid Shape: Chapter 5," Cambridge Mass: MIT Press, pp. 167-194 (1993).

Koller et al., "Multiscale detection of curviline structures in 2-d and 3-d image data," Proceedings of the 5th International Conference on Computer Vision, Boston, MA, pp. 864-869 (1995).

Krissian et al., "Model-based detection of tubular structures in 3D images", CVIU, vol. 81, pp. 130-171 (2000).

Kuppusamy et al., "In Vivo Regional Cerebral Blood Volume: Quantitative Assessment with 3D T1-weighted Pre-and Postcontrast MR Imaging," Radiology, vol. 201, pp. 106-112 (1996).

Lammert et al., "Induction of Pancreatic Differentiation by Signals from Blood Vessels," Science, vol. 294, pp. 564-567 (Oct. 19, 2001).

Lei et al., "Artery-vein separation via MRA—An image processing approach," IEEE-TMI, vol. 20, pp. 689-703 (2001).

Lorenz et al., "Multi-scale Line Segmentation with Automatic Estimation of Width, Contrast and Tangential Direction in 2D and 3D Medical Images," CVRMed-MRCAS '97, LNCS. vol. 1205, pp. 233-242 (1997).

Lorenzen et al., "High-Dimensional Multi-modal Image Registration," WBIR: 234-243 (2003).

Lorigo et al., "Co-dimension 2 geodesic active contours for MRA segmentation," IPMI 99 Lecture Notes in Computer Science, vol. 1613, pp. 126-139 (1999).

Maes et al., "Multimodality image registration by maximization of mutal information," IEEE Transactions on Medical Imaging, vol. 16, No. 2, pp. 187-198 (Apr. 1997).

Maintz et al., "A Survey of medical image registration," In U. Spetzger, H.S. Stiehl, J.M. Gilsbach (Eds.), Navigated Brain Surgery, pp. 117-136 (Oct. 10, 1997).

Masutani et al., "Vascular shape segmentation and structure extraction using a shape-based region-growing model," Proceedings of Medical Image Computing and Computer-Assisted Intervention, Lecture Notes in Computer Science 1496, pp. 1242-1249 (1998).

Masutani et al., "Quantitative vascular shape analysis for 3D MR-angiography using mathematical morphology," Computer Vision, Virtual Reality and Robotics in Medicine, pp. 449-454 (1995).

Matsumoto et al., "Liver Organogenesis Promoted by Endothelial Cells Prior to Vascular Function," Sciece, vol. 294, pp. 559-563 (Oct. 19, 2001).

Mattes et al., "Nonrigid Multimodality Image Registration," Medical Imaging 2001, vol. 4322, Proceedings of SPIE (2001).

Miller et al., "Statistical Methods in Computational Anatomy," Statistical Methods in Medical Research, vol. 6, pp. 267-299 (1997).

Moon et al., "Automatic Brain and Tumor Segmentation," Medical Image Computing and Computer Assisted Intervention (MICCAI), LNCS-2488, pp. 372-379 (2002).

Niessen et al., "Enhanced Artery Visualization in Blood Pool MRA: Results in the Peripheral Vasculature," IPMI 1999, in Lect. Notes Comp. Sci. Berlin, Germany: Springe, vol. 1613, pp. 340-345 (1999).

Notification of Transmittal of the International Search Report and the Written Opinion of the International Searching Authority, or the Declaration for International Application No. PCT/US05/34289 (Mar. 20, 2006).

Park et al., "Segmentation of intrathoracic airway trees: A fuzzy logic Imaging, 17(4): 489-497 (1998). approach," IEEE Transactions on Medical Imaging, 17(4): 489-497 (1998).

Pennec et al., "Tracking brain deformations in time-sequences of 3D US images," Pattern Recognition Letters, 24(4-5): 801-813 (Feb. 2003).

Pizer et al. "Zoom-invariant vision of figural shape: The mathematics of cores," In Computer Vision and Image Understanding, 69, pp. 55-71 (1998).

Porter et al., "Three-Dimensional Registration and Fusion of Ultrasound and MRI Using Major Vessels as Fiducial Markers," IEEE Transactions on Medical Imaging, vol. 20, No. 4, pp. 354-359 (Apr. 2001).

Prastawa, "Automatic brain and tumor segmentation" (2003(a)).

Prastawa et al., "Robust Estimation for Brain Tumor Segmentation," MICCAI 2003 Proceedings, pp. 530-537 (2003).

Reuze et al., A 3-d moment based approach for blood vessel detection and quantification in MRA. Technology and Health Care, 1: 181-188 (1993).

Ricci et al., "Differentiating Recurrent Tumor from Radiation Necrosis: Time for Re-evaluation of Positron Emission Tomography?," American Journal of Neuroradiology, vol. 19, pp. 407-413 (Mar. 1998).

Roche et al., "Rigid Registration of 3D Ultrasound with MR Images: a New Approach Combining Intensity and Gradient," IEEE Transactions on Medical Imaging, 20(10): 1038-1049 (Oct. 2001).

Rueckert et al., "Non-rigid Registration Using Free-Form Deformations: Application to Breast MR Images," IEEE Transactions on Medical Imaging, vol. 18, No. 18, pp. 712-721 (Aug. 1999).

Sato et al., "Three-dimensional multi-scale line filter for segmentation medical images," Medical Image Analysis, vol. 2, pp. 143-168 (1998).

Schmalbrock et al, "TOF and BOLD 3D Gradient Echo Imaging of Cerebral Vasculature at 8T," Proc. Intl. Soc. Mag. Reson. Med. 10, p. 1 (2002).

Schnabel et al., "A Generic Framework for Non-Rigid Registration Based on Non-Uniform Multi-Level Free-Form Deformations," MICCAI 2001; LNCS 2208, pp. 573-581 (2001).

Seydel, "Organs Await Blood Vessels' Go Signal," Science, vol. 293, p. 2365 (Sep. 28, 2001).

Smedby et al., "Two-Dimensional Tortuosity of the Superficial Femoral Artery in Early Atherosclerosis," Journal of Vascular Research, vol. 30, pp. 181-191 (1993).

Swallow et al., "Reliability of Functional Localization using fMRI," Neurolmage, vol. 20, pp. 1561-1577 (2003).

Székely et al., "Structural description and combined 3-D display for superior analysis of cerebral vascularity from MRA," SPIE 2359, pp. 272-381 (1994).

Tek et al., "Volumetric segmentation of medical images by three-dimensional bubbles," Proc Workshop on Physics-Based Modeling, IEEE press, pp. 9-16 (1995).

Thees et al, "Dipole Source Localization and fMRI of Simultaneously Recorded Data applied to Somatosensory Categorization," Neurolmage, vol. 18, pp. 707-719 (2003).

Van den Eisen et al., "Automatic Registration of CT and MR Brain Images Using Correlation of Geometrical Features," IEEE Transactions on Medical Imaging, vol. 14, No. 2, pp. 384-396 (Jun. 1995).

Van Dyke et al., "Cancer modeling in the modern era: progress and challenges," Cell 108, pp. 135-144 (2002).

Van Leemput et al., "Automated Model-Based Tissue Classification of MR Images of the Brain," IEEE Transactions on Medical Imaging, vol. 18, No. 10, pp. 897-908 (Oct. 1999).

Viola et al., "Alignment by Maximization of Mutual Information," International Journal of Computer Vision, vol. 24, No. 2, pp. 137-154 (1997).

Wang, "Functional Data Analysis of Populations of Tree-structured Objects," Internet available at: http://midag.cs.unc.edu/pubs/papers/WangH_report.pdf (2002).

Weeks et al., "Volume Estimations Using Conventional Hand Tracing Techniques vs. Automatic Thresholding Techniques: Can We Be More Accurate and Save Time?," Radiological Society of North America, Abstract (Nov. 2001).

West et al., "Retrospective Intermodality Registration Techniques for Images of the Head: Surface-Based Versus Volume-Based," IEEE Transactions on Medical Imaging, vol. 18, No. 2, pp. 144-150 (Feb. 1999).

Wilson et al., "An Adaptive Segmentation Algorithm for Time-of-Flight MRA Data," IEEE Transaction on Medical Imaging, vol. 18, No. 10, pp. 938-945 (Oct. 1999).

Wilson et al., "Evaluation of 3D Image Registration as Applied to MR-Guided Thermal Treatment of Liver Cancer," JRMI 8: 77-14 (1998).

Wilson et al., "Segmentation of Cerebral Vessels and Aneurysms from MR Angiography Data," Lect Notes Comp Sci 1230, pp. 428-433 (1997).

Wink et al., "Vessel Axis Determination Using Wave Front Propagation Analysis," MICCAI 2001, LNCS 2208, pp. 845-853 (2001).

Xu et al., "Randomized Hough Transform (RHT): Basic Mechanisms, Algorithms, and Computational Complexities," CVGIP: Image Understanding, vol. 57, No. 2, pp. 131-154 (Mar. 1993).

Yim et al., "Gray-scale skeletonization of small vessels in magnetic resonance angiography," IEEE Transactions on Medical Imaging, 19(6): 568-576 (2000).

Yoshii et al., "Cerebral Radiation Necrosis with Accumulation of Thallium 201 on Single-Photon Emission CT," AJNR, vol. 17, pp. 1773-1776 (Oct. 1996).

Zhou et al., "The Detection and Quantification of Retinopathy Using Digital Angiograms," IEEE Transactions on Medial Imaging, vol. 13, No. 4, pp. 619-626 (Dec. 1994).

\* cited by examiner

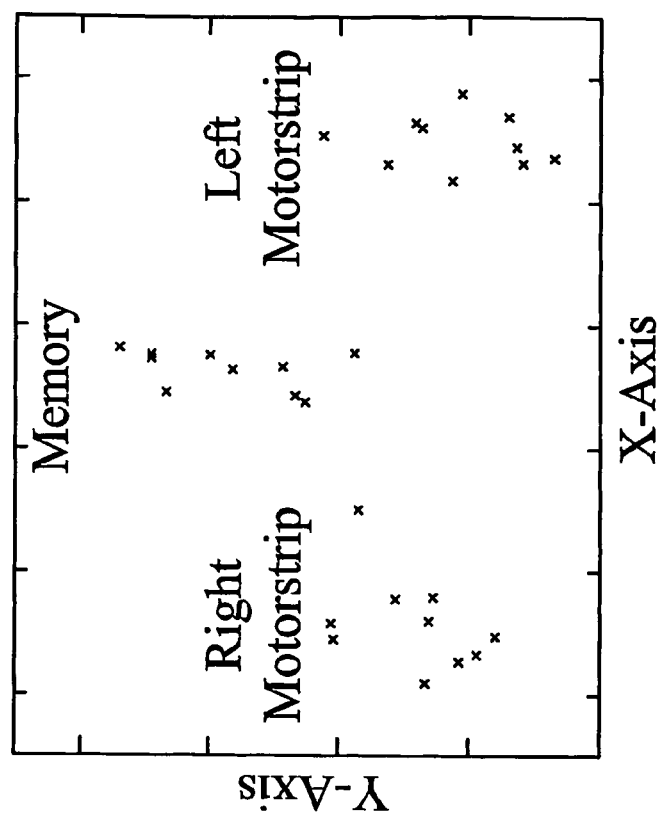
FIG. 23B Functional Centers Aligned Through Anatomical Registration
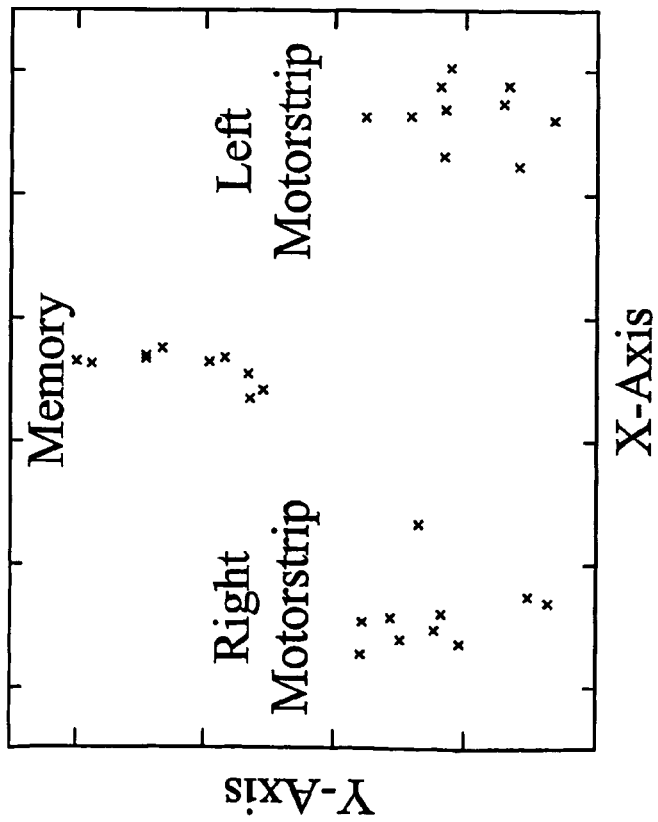
FIG. 23A Functional Centers Aligned Through Arterial-Based Registration

SYSTEMS, METHODS, AND COMPUTER PROGRAM PRODUCTS FOR ANALYSIS OF VESSEL ATTRIBUTES FOR DIAGNOSIS, DISEASE STAGING, AND SURGICAL PLANNING

CROSS-REFERENCE TO RELATED APPLICATIONS

This nonprovisional application claims the benefit of U.S. Provisional Patent Application No. 60/497,656, filed Aug. 25, 2003, the disclosure of which is incorporated by reference herein in its entirety.

GRANT STATEMENT

The subject matter disclosed herein was supported by grant number RO1 EB000219 from the National Institutes of Health. Thus, the U.S. Government has certain rights in the invention.

TECHNICAL FIELD

The subject matter disclosed herein relates generally to analyzing blood vessel attributes. More particularly, the subject matter disclosed herein relates to systems, methods, and computer program products for analysis of vessel attributes for diagnosis, disease staging, and surgical planning.

BACKGROUND ART

Blood vessels surround and permeate organs and diseased tissue in organisms that have vascular systems. It has been determined that blood vessels in the same anatomical regions of similar individuals may have similar attributes. The terms "blood vessel attribute," "vascular attribute," and "attribute" are used interchangeably herein to refer to any quantifiable characteristic of a blood vessel or group of blood vessels by which vessel populations can be compared. Examples of blood vessel attributes include blood vessel density, number of blood vessels, blood vessel radius, irregularity of blood vessel radius, branching frequency, tortuosity, length, direction, permeability, or any other shape or functional measure that can be defined for an individual vessel or group of vessels. For example, vascular density may be similar in the same anatomical regions in healthy individuals. It has also been determined that individuals who are prognostically different from individuals in a given population may have different vascular attributes either globally or within one or more anatomical regions. For example, patients having malignant tumors have been determined to have abnormally tortuous vessels in the anatomical region corresponding to the tumor. Thus, it may be desirable to compare vascular attributes among different individuals for purposes of disease diagnosis, disease staging, and surgical planning.

One problem with analyzing and comparing vessel attributes of different individuals is that vessel structure and corresponding tissue structure vary, even in the same anatomical region of members of the same (e.g., healthy or sick) population. In order to determine average vessel attributes among members of a population, it is necessary to measure corresponding vessel attributes in different individuals. However, because of the differences in vessel structure among members of the same population, establishing correspondence can be computationally intensive. In some cases, establishing exact correspondence based on blood vessel image data alone is impossible.

Accordingly, there exists a need for improved systems, methods, and computer program products for analyzing vessel attributes for diagnosis, disease staging, and surgical planning. There also exists a need for methods, systems, and computer program products for making corresponding blood vessel attribute measurements among members of a population.

SUMMARY OF THE INVENTION

Methods, systems, and computer programs products are disclosed for analyzing blood vessel attributes for diagnosis, disease staging, and surgical planning. A method for analyzing blood vessel attributes may include developing an atlas of blood vessel attributes. The atlas may include statistical measures for one or more blood vessel attributes. The statistical measures may be developed from blood vessel image data from a plurality of different individuals. The statistical measures may include standard statistical measures, such as mean and variance, of blood vessel attribute measurements among members of a population. Alternatively, the statistical measures may include blood vessel attribute measurements for each member of a population to which a test subject's blood vessel attributes are to be compared. In order to evaluate a subject of interest, blood vessel attribute measurements may be obtained from the subject. The subject's blood vessel attribute measurements may be compared to the statistical measures in the atlas. Disease diagnosis, staging, and/or surgical planning may be performed for the individual subject based on results of the comparison.

Methods, systems, and computer programs products are also disclosed for making corresponding measurements across individuals to characterize populations of patients and to classify the population to which a patient is likely to belong. The method may include modeling the blood vessels in a plurality of different individual patients. A map of blood vessel characteristics may be calculated for each model. Correspondence across individuals may be established by aligning the models with the maps of blood vessel characteristics. Based on the correspondences, population summaries of consistent measures may be formed for diseased and un-diseased groups. The method may also include using the population summaries to distinguish normal from abnormal measures.

BRIEF DESCRIPTION OF THE DRAWINGS

Exemplary embodiments of the subject matter will now be explained with reference to the accompanying drawings, of which:

FIGS. 23A and 23B are X-Y plots of the two-dimensional spatial locality of the three functional clusters for artery- and tissue-aligned groups, respectively.

DETAILED DESCRIPTION OF THE INVENTION

I. Definitions

Figure 1:
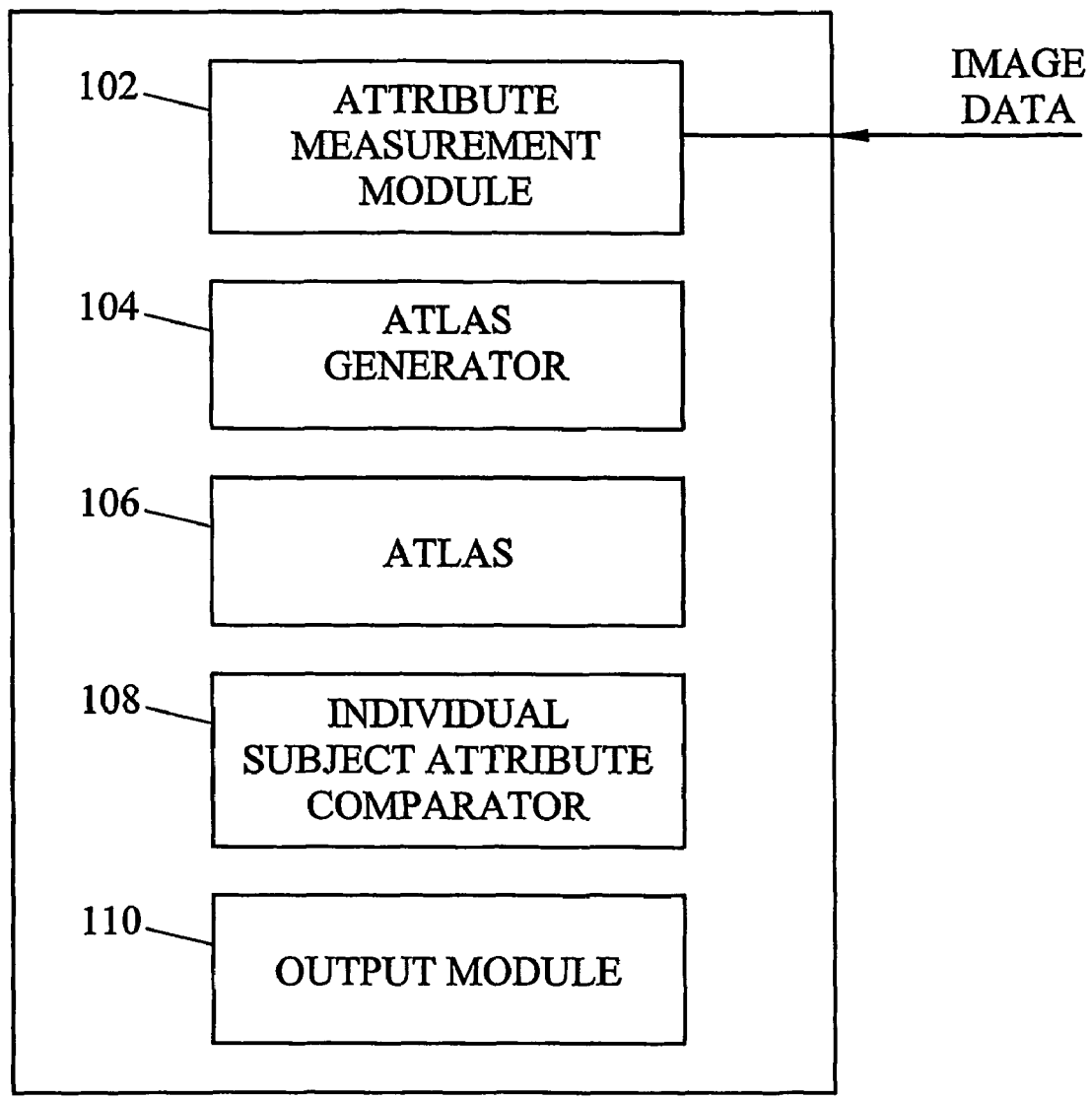
FIG. 1 is a block diagram of a blood vessel attribute analysis system according to one embodiment of the subject matter disclosed herein.

Following long-standing patent law convention, the terms "a" and "an" mean "one or more" when used in this application, including the claims.

As used herein, the term "abnormal vessel" refers to a blood vessel having abnormal attributes when compared to a plurality of different blood vessel attributes of healthy subjects.

As used herein, the terms "individual," "patient," and "subject" are used interchangeably herein and are intended to refer to any individual having a vascular system. The terms "individual," "patient," and "subject" are intended to include both human and non-human organisms having vascular systems.

II. General Considerations

Blood vessels surround and permeate the organs of the human body. Almost every disease, from cancer to hypertension to the common cold, can affect vascular attributes. Therefore, the clinical recognition of abnormal vascular shape and/or size is important to the diagnosis of many diseases. Exemplary vascular attributes are vessel number, radius, branching frequency, and tortuosity. Tortuosity, for example, can be important when evaluating atherosclerosis, since abnormal tortuosity is associated with an increased risk of stroke and with failure of endovascular therapy. Disease processes, such as diabetes, hypertension, and the vasculopathies, affect the circulation globally and produce small, abnormally tortuous vessels that may be the primary cause of intra-cerebral hemorrhage. In addition, malignant tumors and vascular malformations can each produce localized clusters of abnormally tortuous vessels. Abnormal vessel tortuosity has been associated with many malignant tumors, including those of lung, colon, breast, and brain. Successful treatment with anti-angiogenic agents can reduce the tortuosity of the abnormal vessels. The methods, systems, and computer program products disclosed herein quantify and compare the shapes and sizes of individual vessels and groups of vessels for the diagnosis, staging, and therapeutic monitoring of a variety of diseases.

Development of a vascular atlas is described herein for measuring expected vessel distribution in healthy and/or unhealthy subjects. Forming the average vascular matrix within brain matter, for example, can be useful for identifying subtle changes in vessel formation not visible through standard tissue analysis. Construction of the atlas according to one implementation of the subject matter disclosed herein involves the application of tissue-based anatomical registration transforms to corresponding individual vascular density maps, resulting in a mean vascular density atlas with expected variance. Individual subjects can then be registered with the atlas using tissue-based transforms and vascular density and other vessel attributes in corresponding anatomical regions can be compared. In an alternate implementation of the subject matter described herein, vessel-based registration may be used to align the vasculatures of different subjects for comparison.

Establishment of a mean vascular atlas with expected deviation as described herein has numerous medical applications including pre-operative planning and diagnosis, identification of vascular anomalies, and assessment of an individual's vascular changes over time. This atlas may also aid in diagnosis of mental disorders, such as schizophrenia, that have a strong genetic component. With brain vasculature forming prior to tissue development, a vascular atlas may provide a more direct measure of the genetic component of such mental disorders. An atlas of vasculature may also be advantageous for identifying affected areas, analyzing vascular malformation, and estimating arterial compensation. In addition, a vascular atlas may be used in conjunction with an anatomical atlas for additional verification and statistical validation. The vascular atlas may also be used for separating malignant from non-malignant tumors and separating necrotic regions from malignant regions.

III. Configuration and Operation of Blood Vessel Attribute Analysis System

A. Exemplary System Architecture

The systems, methods, and computer program products for analyzing blood vessel attributes will be explained in the context of flow charts and diagrams. It is understood that the flow charts and diagrams may be implemented in hardware, software, firmware, or any combination thereof. Thus, the subject matter disclosed herein may include computer program products comprising computer-executable instructions embodied in computer-readable media for performing the steps illustrated in each of the flow charts or implementing the devices illustrated in each of the diagrams.

Blood vessel attribute analysis according to one embodiment of the subject matter disclosed herein involves a statistical comparison of vessel attributes between one or more test subjects and an atlas of normal or abnormal subjects. Comparison may be made on the basis of identifiable individual vessels, by vessel trees or subtrees, by vessels of a particular diameter or possessing some other range of attribute(s) in common or on the basis of vessels and vessel segments lying within a particular anatomical region. FIG. 1 is a block diagram of a blood vessel attribute analysis system 100 according to one embodiment of the subject matter disclosed herein. In FIG. 1, system 100 includes an attribute measurement module 102, an atlas generator 104, an atlas 106, an individual subject attribute comparator 108, and an output module 110. Components 102, 104, 106, 108, and 110 may function together for analyzing blood vessel attributes of the subject. For example, attribute measurement module 102 may receive image data and output blood vessel attribute data. Atlas generator 104 may generate atlas 106 including blood vessel attribute statistics for a population of individuals. Attribute comparator 108 may compare individual attributes to the data contained in atlas 106. Output module 110 may output results based on the comparison that are useful for disease diagnosis, staging, therapeutic monitoring, pre-operative planning, identification of vascular anomalies, assessment of an individual's vascular changes over time, and various other health-related purposes.

B. Exemplary Overall Method for Blood Vessel Attribute Analysis

In one embodiment of the subject matter disclosed herein, blood vessel attribute analysis may include the following four main steps—(1) developing an atlas of blood vessel anatomy, wherein the atlas includes statistical measures for different attributes of the blood vessels; (2) obtaining blood vessel attribute measurements from an individual subject; (3) comparing the individual subject's blood vessel attribute measurements to the statistical measures in the atlas; and (4) performing disease diagnosis or staging for the individual subject based on the comparison.

Figure 2:
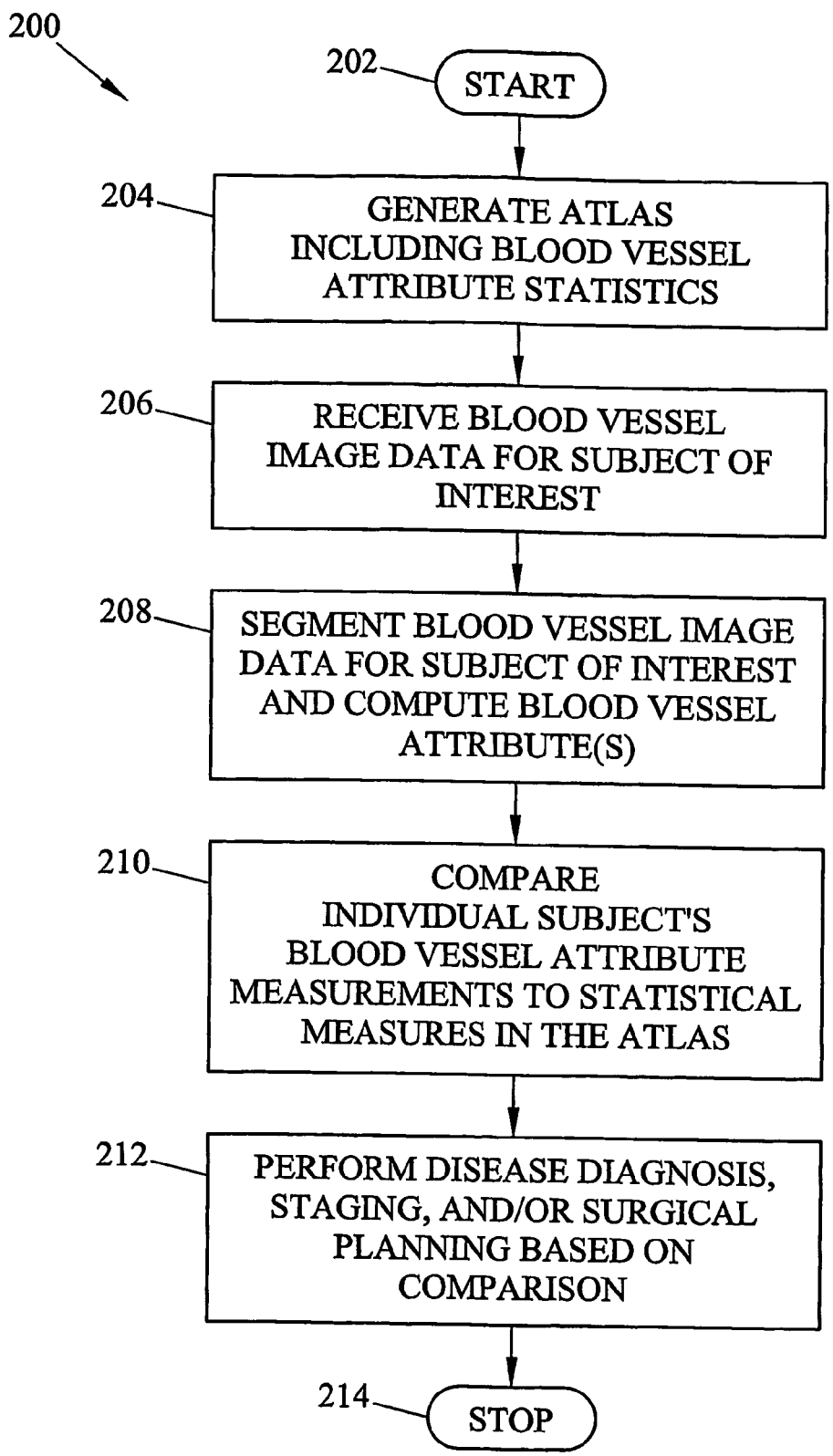
FIG. 2 is a flow chart illustrating a process for blood vessel attribute analysis according to an embodiment of the subject matter disclosed herein.

Referring to FIG. 2, a flow chart, generally designated 200, illustrates a process for blood vessel attribute analysis according to an embodiment of the subject matter described herein. As stated above, blood vessel attribute analysis may be performed by system 100. The process begins at the step indicated by reference numeral 202. At step 204, atlas generator 104 may generate atlas 106 including blood vessel attribute statistics based on blood vessel images received from a plurality of different individuals. The atlas may include statistical measures for one or more blood vessel attributes. Attribute measurement module 102 is operable to obtain the blood vessel attributes from blood vessel images, as will be described in further detail below. The blood vessel images may be collected from randomly selected individuals or individuals having a particular pathology. Examples of blood vessel attributes that may be measured and included in atlas 106 may include tortuosity, ratio of vessel volume to tumor volume, vessel density, average radius of vessels or vessel segments within the region of interest, and count of terminal branches.

At step 206, blood vessel image data of a specific anatomical region in a subject of interest may be received by attribute measurement module 102. The received image data may be any image data in which blood vessel attributes are identifiable. Examples of image data suitable for use with embodiments of the present invention include magnetic resonance angiogram (MRA) data, computerized tomography angiogram (CTA) data, ultrasound image data, and confocal microscope image data. Next, module 102 may segment the blood vessels shown in the images and obtain attribute measurements of the blood vessels (step 208). Segmentation may include extracting the blood vessels from the surrounding tissue in the blood vessel image data. An exemplary method for segmenting blood vessels will be described in detail below. The attributes measured for the individual subject may be any one or more of the attributes present in atlas 106.

At step 210, attribute comparator 108 may compare the individual subject's blood vessel attribute measurements to the statistical measures in the atlas. In one exemplary implementation, blood vessel image data for the individual is registered with the blood vessel image data in the atlas. Measured blood vessel attributes for the individual subject are the compared to statistical measures in the atlas for the corresponding anatomical region. The results of the comparison may indicate how the individual's blood vessel attribute measurements compare to those of the population. For instance, one comparison of interest for a particular attribute may indicate the number of standard deviations between the measurement for the individual subject and the mean value of the attribute measurement for the population. In step 212, based on the comparison, output module 110 may output data indicative of a physical characteristic of the subject. For example, the output may indicate the location of a vessel abnormality in the subject. The data can be used to perform disease diagnosis, staging and/or surgical planning for the subject. Alternatively, comparison results can be analyzed by an operator of system 100 for disease diagnosis, staging, and/or surgical planning for the subject. The process ends at step 212.

Figure 3:
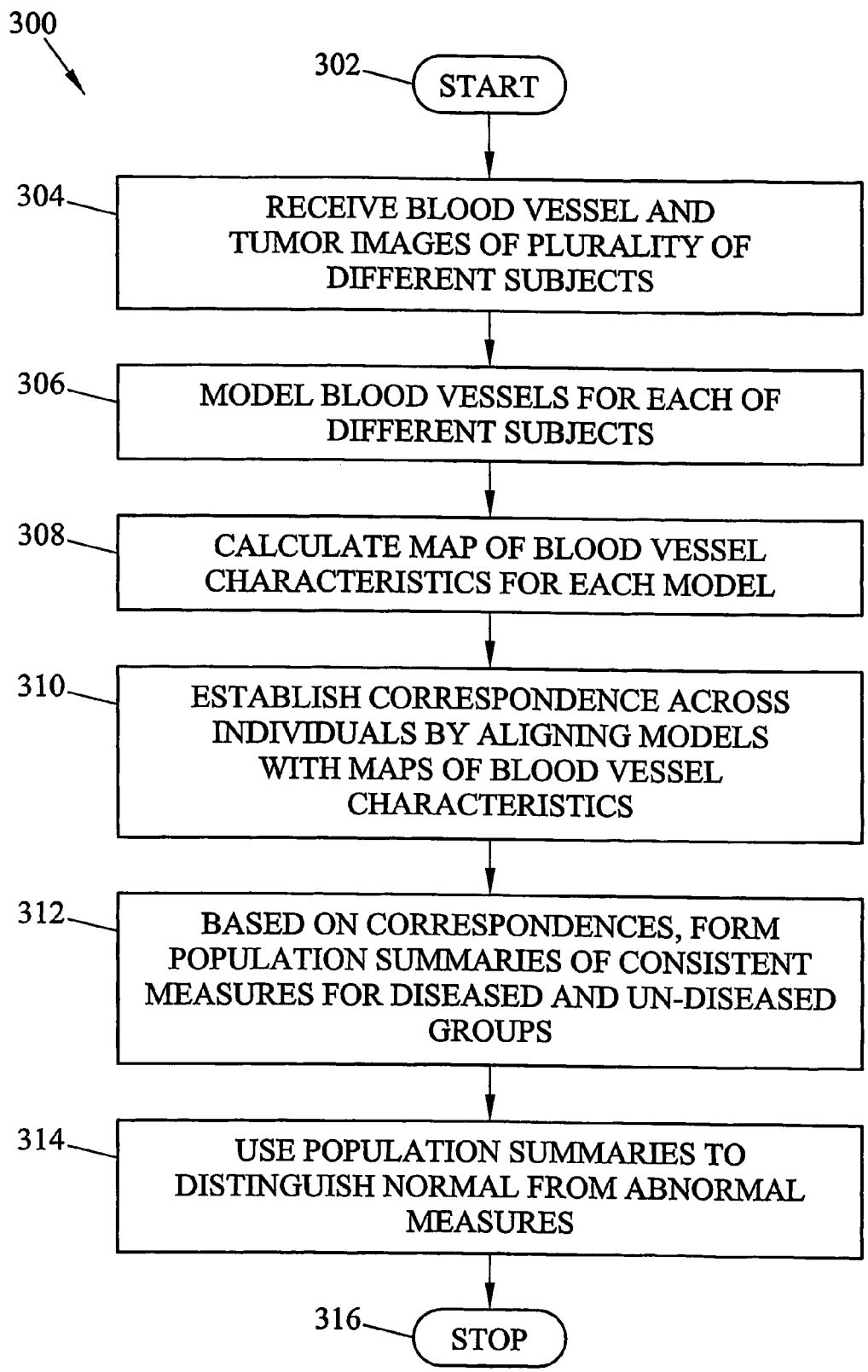
FIG. 3 is a flow chart illustrating an exemplary process for implementing a method for making corresponding measurements across individuals to characterize populations of patients and to classify the population to which a patient is likely to belong according to an embodiment of the subject matter disclosed herein.

C. Exemplary Overall Method for Making Corresponding Blood Vessel Attribute Measurements Across a Population According to another aspect of the subject matter described herein, system 100 may implement a method for making corresponding measurements across individuals to characterize populations of patients and to classify the population to which a patient is likely to belong. Making corresponding measurements across individuals is difficult, since blood vessel attributes vary among individuals that are members of the same population. Referring to FIG. 3, a flow chart, generally designated 300, illustrates a method for making corresponding blood vessel attribute measurements across a population. The process begins at the step indicated by reference numeral 302. At step 304, blood vessel image data in specific anatomical regions of a plurality of different subjects may be received by module 102. For example, the specific regions may include images of the vasculature of specific organs, tumors, or other regions in healthy or unhealthy subjects. Next, system 100 may model or segment the blood vessels for each of the different subjects (step 306). An exemplary method for modeling blood vessels suitable for use with embodiments of the subject matter described herein is described in commonly assigned U.S. Pat. No. 6,690,816 to Aylward et al., the disclosure of which is incorporated herein by reference in its entirety. System 100 may then calculate a distance map for each model (step 308). A distance map is an image in which each voxel's intensity corresponds to the expected distance to the nearest vessel. An exemplary method for computing a distance map is described in Danielsson, P. E., "Euclidean Distance Mapping," Computer Graphics and Image Processing, vol. 14, pp. 227-248 (1980).

Correspondence may be established across individuals by aligning the models with the maps of blood vessel characteristics (step 310). Exemplary alignment methods will be described in detail below. Based on the correspondences, population summaries of consistent measures can be formed for diseased and un-diseased groups (step 312). These population summaries can then be used to distinguish normal from abnormal measures (step 314). The process ends at step 316.

D. Blood Vessel Image Acquisition and Segmentation
1. Image Acquisition As illustrated in FIGS. 1-3, in order to analyze blood vessel attributes, blood vessel images must be acquired. Blood vessel images suitable for use with embodiments of the present invention may be obtained using any suitable high-resolution imaging device, such as a computerized tomography (CT) imaging device, a magnetic resonance (MR) imaging device, an ultrasound-imaging device, or a confocal microscope imaging device. Two particular types of images particularly suitable for blood vessel attribute analysis are 3D time-of-flight, magnetic resonance angiograms (MRAs) and computer topographic angiograms (CTAs).

2. Segmentation

As discussed above, the process of segmentation refers to the process of identifying blood vessels from blood vessel image data. Segmentation methods suitable for use with embodiments of the present invention include automated methods, semi-automated methods, and manual methods. Automated methods are ideal because the methods do not vary by user. In an automated method, blood vessel image data is input into a computer and the computer identifies blood vessels in an image. One problem with automated methods is that they are not universal to all types of data.

As a compromise to automated methods, semi-automated methods may be used. In semi-automated methods, a human guides a computer in some manner during the segmentation process. For example, to extract an entire blood vessel, the user may only have to click once to start the process, and the rest is automatic. For organs or tumors, the user may only have to draw a circle around the affected area, and the computer extracts a model of the tumor based on the initialization.

In manual methods, a user may identify a vessel by manual analysis of blood vessel image data. For example, the user may trace the blood vessel or blood vessels from the image data. The problem with manual methods is that they are both time-consuming and subject to variability among users.

In one implementation of the subject matter described herein, blood vessel segmentation may be an automated or semi-automated method, for example, as described in the above-referenced '816 patent. According to this method, attribute measurement module 102 may receive grayscale or color image data of the blood vessels of interest from any of the medical imaging devices describe above. In some images, such as MRAs, blood vessels may be identified by bright voxels and may be extracted using a dynamic scale intensity ridge and radius estimation process.

An initial step to blood vessel segmentation includes defining a seed point in the image inside or near a vessel. An operator of system 100 may select the seed point via a user interface, or the seed point may be automatically selected by system 100. Next, module 102 may determine an image intensity ridge representing the blood vessel's central skeleton. Module 102 may then determine the blood vessel's width or radius at each skeleton point.

Once a blood vessel is segmented, the region may be marked so that subsequent vessel segmentation stops if a second vessel abuts the first vessel. This may prevent two vessels from occupying the same region of space. The result of the segmentation process is a set of directed, 4-dimensional points indicating the (x,y,z) spatial position of each sequential vessel skeleton point and an associated radius. The vessel skeleton may be defined as a spline, which may subsequently be sampled at regularly spaced intervals.

The output of the vessel segmentation process may include as a part of the initial segmentation process or as a result of post-processing a set of 3-dimensional (3D) vessel "trees," in which vessels are linked on the basis of distance and the existence of supporting image intensity information or by other means. Once formed, the trees may be turned off and individual vessels may be clipped proximally or distally. Furthermore, the vessel trees may show the direction of vessel flow.

According to one embodiment, a vessel tree may be generated when an operator of system 100 selects one or more vessels as a "root." Vessel tree description may be provided by a post-processing process implemented by system 100 that employs a cost function based upon distance and image-intensity information. This process can be applied to any 3-dimensional image type in which tubular objects are of higher intensity than background.

Figure 4B:
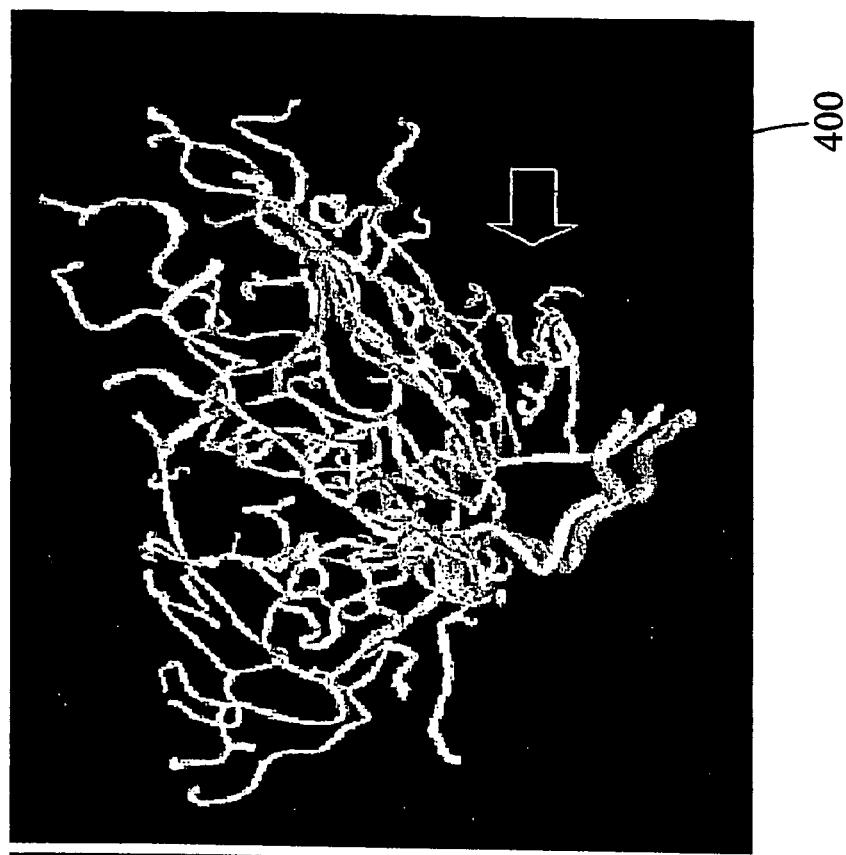
FIG. 4B is a surface rendering of the extracted vessel trees of the image in FIG. 4A shown from the same perspective as FIG. 4A.
Figure 4A:
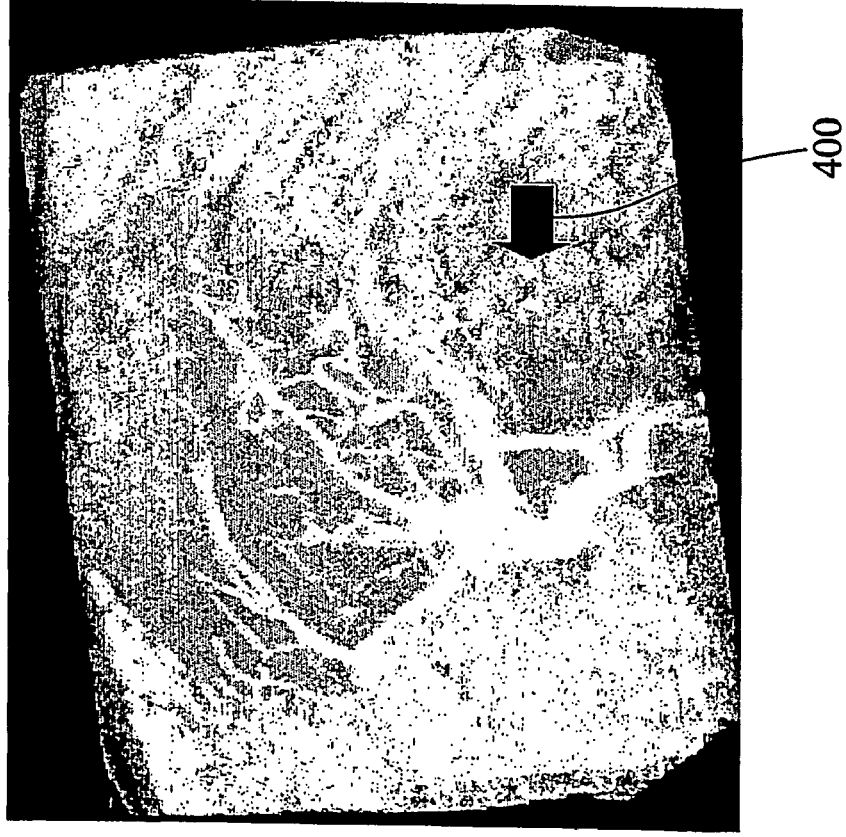
FIG. 4A is an exemplary image of maximum intensity projection of a magnetic resonance angiogram (MRA) in a malignant tumor patient.

FIG. 4A is an exemplary image of maximum intensity projection of an MRA in a malignant tumor patient. The MRA shown in FIG. 4A has a voxel size of $0.5 \times 0.5 \times 0.8$ mm$^3$. FIG. 4B is a surface rendering of the extracted vessel trees of the image shown in FIG. 4A and from the same perspective as FIG. 4A. The subtree supplying the tumor may be shown in the image data using a different color, such as red, from the remaining vasculature, and an arrow 400 points to the relevant vessel group in each image. Many of the vessels of interest are one voxel in diameter and may be very faint in the maximum intensity projection of the original dataset. As illustrated in FIG. 4B, the segmentation methods described herein are capable of producing accurate blood vessel images, even when the blood vessel in the source image data are faint or hard to distinguish from background structures.

E. Atlas Formation
1. In General

Formation of a vascular atlas involves establishing correspondence between blood vessel structures of different individuals and computing blood vessel attribute measurements for the corresponding vessel structures or anatomical regions. Forming a vascular atlas suitable for comparison with an individual subject's blood vessel image data may be performed using a variety of mapping methods or transforms to establish correspondence between blood vessel structures or anatomical regions. For example, the mapping method used to map vessels to each other may be a rigid mapping method, whereby an object is mapped to another object without changing the shape of either object, an affine mapping method, whereby the outer boundaries of one object are scaled and mapped to those of another object, or a fully deformable mapping method, whereby internal features of an object are scaled and mapped to internal features of another object. In addition, the transform used to perform the mapping may be symmetric or asymmetric. The objects used to do the mapping may be the blood vessels themselves, the tissue adjacent to the blood vessels, or a combination of tissue and blood vessels. Mapping between images may be performed using an average image that is not a member of the set of images used in creating the atlas or using a representative image as a template that is a member of the images used to form the atlas. In addition, an atlas may be formed using multi-modal images for each individual.

A blood vessel attribute atlas may include one or more statistical measurements that represent the vasculature of the population from which the atlas was formed. For example, it may be desirable to build an atlas of blood vessel density for an anatomical region in a population so that the density in the atlas may be compared to vessel densities for corresponding subjects under test to detect blood vessel density anomalies. Another parameter of interest that may be included in the atlas may be blood vessel radius in a given anatomical region. Generally, a blood vessel attribute atlas may include individual measurements or average and standard deviations of any of the blood vessel attributes discussed above in the definition given for blood vessel attribute. Such attributes may include attributes for a specific anatomical region within an individual or global attributes for the individual. Analysis of attributes within a specific region may include analysis of attributes of a subset of vessels within the individual, such as vessels of entry or vessels of exit from a particular region. Analyzing vessels of entry or vessels of exit may be useful in examining arteriovenous malformations.

Figure 5:
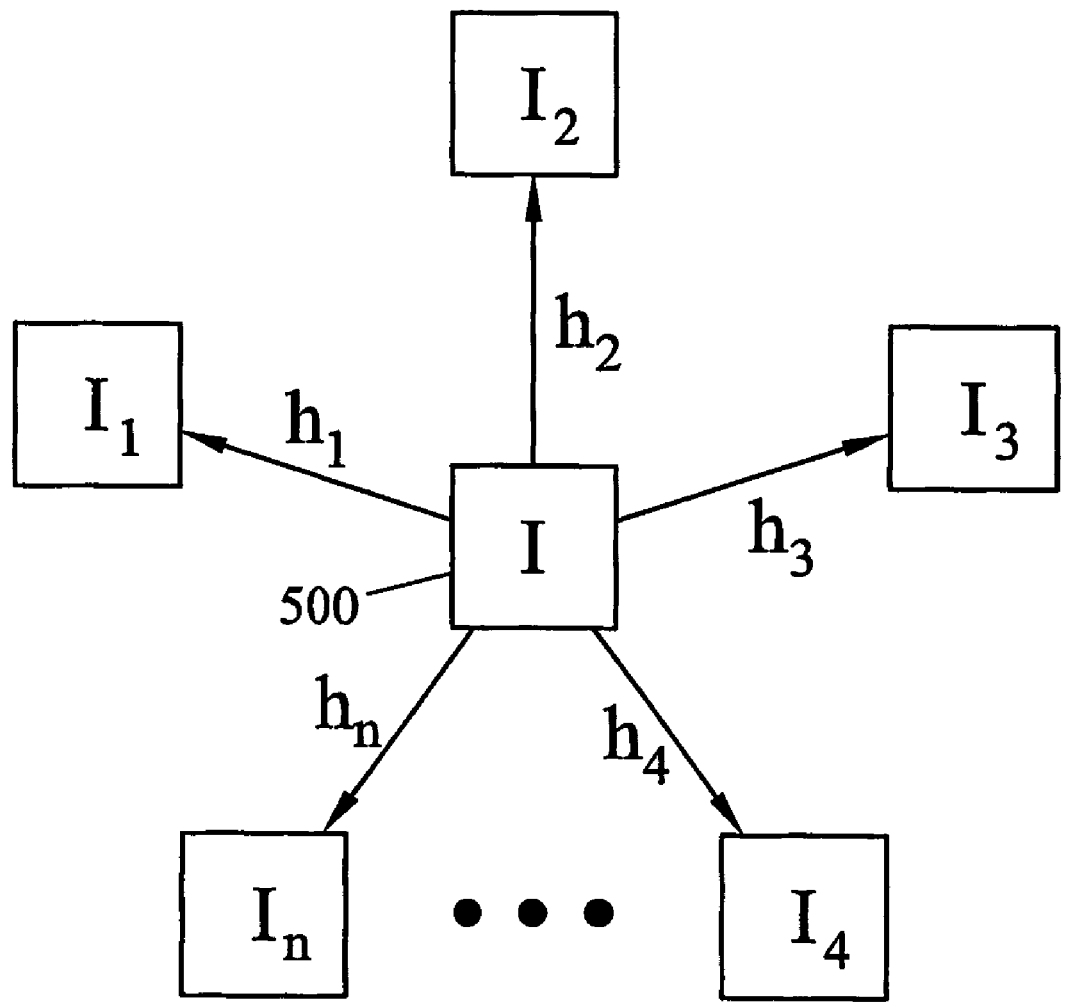
FIG. 5 is a block diagram of an exemplary central-image-based atlas formation method suitable for use with embodiments of the present invention.

2. Method for Vascular Atlas Formation Using Vessel-Based Registration a. Introduction One method for establishing correspondence between or registering images in the vascular atlas formation process is to map each image in a population to a central image, where the central image is an average image that is not a member of the image population. FIG. 5 illustrates this concept. In FIG. 5, images $I_1$-$I_n$ map to a central image i using transforms $h_1$-$h_n$. The optimal anatomical representation of a central image (the template) is one that requires the minimum transformation from the template to each of the input anatomical images. For low dimensional rigid transformation groups, the Procrustes method produces such a template. (See Dryden I., Mardia K., *Statistical Shape Analysis*, John Wiley & Sons New York (1998).) In the small deformation high dimensional setting one can build a template by averaging registration maps. (See Miller M., Banerjee A., Christensen G., Joshi S., Khaneja N., Grenander U., Matejic L., "Statistical Methods in Computational Anatomy," *Statistical Methods in Medical Research*, vol. 6, pp. 267-299 (1997).)

One framework for a brain atlas employs a Bayesian approach and may include images of multiple modalities. This approach is based on the simplified assumption that human brain anatomy consists of finitely enumerable subclasses, such as grey matter (GM), white matter (WM), cerebrospinal fluid (CSF), tumor, and edema, and that, across disparate image modalities, these structures possess different radiometric intensity values. Given multi-modal image sets for two or more subjects, the posterior distributions associated with each of the tissue subclasses can be estimated jointly with the registration map used to relate the coordinate spaces of the different subjects. Optimal inter-subject multi-modal image registration is estimated by an alternating iterative algorithm that is motivated by an expectation maximization method used in Moon N., Bullitt E., Leemput K., Gerig G., "Automated Model-Based Tissue Classification for Brain Tumor Segmentation," *Medical Image Computing and Computer Assisted Intervention (MICCAI)*, vol. LNCS-2489, pp. 372-379 (2002) and Van Leemput K., Maes F., Vandermeulen D., Suetens P., "Automated Model-Based Tissue Classification of MR Images of the Brain," *IEEE Transactions on Medical Imaging (TMI)*, vol. 18, pp. 897-908 (1999). Vessels are incorporated into the multimodal registration and atlas estimation framework by adding a vessel class. Unlike the other classes, the vessel class is a compound class consisting of multiple vessels each having properties of location, radius, direction, curvature, and tortuosity. A probability distribution can be constructed at each point in the image coordinate system associated with the vessel class from the segmentation of the vascular network provided by the method of Aylward et al. (See Aylward S. R., Jomier J., Weeks S., Bullitt E., "Registration and Analysis of Vascular Images," IJCV 55:123-138 (2003)). In one exemplary implementation, the probability distribution may be a distance map, such as a Danielsson distance map. Thus, one method for atlas generation can include generating a central or average image that is not a member of the population of individuals used to form the atlas. Image data for individuals used to form the atlas can then be mapped to the distance map computed for the central image. Distance maps may then be computed for the registered image data of the individuals. The mean and variance of the distance maps form the atlas.

In an alternate implementation, an atlas can be formed using an individual as an initial estimate of the population's center, and registration between vascular images can be performed using the vessels themselves. As with the approach described above, the method is amenable to mapping between subjects by using rigid transformation, affine transformation, or fully deformable mapping. The implementation described below employs affine registration and selects one individual in the group to serve as the initial template to which all other subjects are mapped. Two examples of blood vessel density atlases—one for the human liver and the other for the human brain—that were formed using this method will be provided.

According to this implementation, an atlas may be formed using a vascular model-to-image affine registration method and a distance map. As described above, a distance map is an image in which each voxel's intensity corresponds to the expected distance to the nearest vessel. By registering an individual's vascular model with a distance map, correspondence issues due to inter-patient vascular network variability are eliminated. Thus, for a group of subjects, each subject's vascular network can be registered with the distance map where the distance map is initially defined using one subject's vascular network. The distance maps of the registered vascular networks can then be computed. The mean and variance of the distance maps form the atlas. Simulation results indicate that the vascular model-to-image registration using a distance map is reliable. Therefore, the resulting atlas and its measures are stable. Because of this stability, the vascular atlas can be used to detect vascular anomalies within an individual and to quantify the vascular network differences between populations, e.g., to detect schizophrenia.

b. Methods i. Blood Vessel Extraction

Blood vessels can be extracted using any suitable method, such as the method described above in the '816 patent to Aylward et al. Briefly, this method includes representing a vessel as a centerline, constituted of a set of points. The N dimensional blood vessel image data may have the following components:

$x_i$, ($x_i \in R^N$) spatial position $r_i$ radius $m_i$ medialness (a measure of how well the vessel section is differentiated from the background)

Any suitable high resolution imaging method, such as CT or magnetic angiogram scans, can be used for this method. In some imaging methods, such as MR, blood vessels may appear as bright voxels in the images and are extracted using the dynamic scale intensity ridge and radius estimation method detailed in the above-referenced '816 patent to Aylward et al. Briefly, this process includes three steps: (1) selecting a seed point inside or near a vessel, (2) traversing the centerlines of vessel tubes as intensity ridges, and (3) estimating the radius at each ridge point.

Figure 6A:
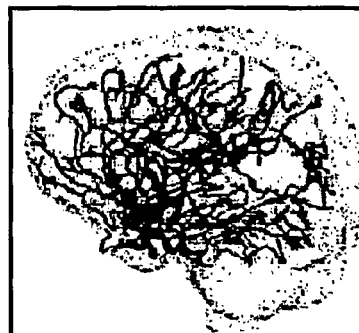
FIGS. 6A-6D illustrate exemplary segmented images of the intra-cerebral vasculature suitable for blood vessel attribute analysis according to an embodiment of the present invention.
Figure 6B:
Figure 6C:
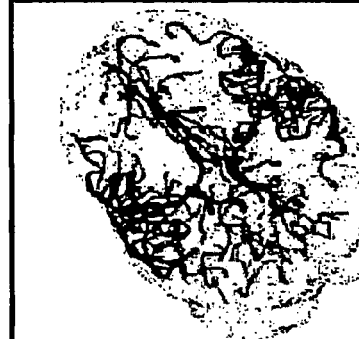
Figure 6D:
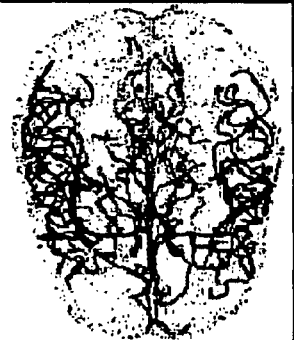

FIGS. 6A-6D illustrate exemplary images of the brain vasculature and tissue envelope of a normal subject extracted using the tubular object based method described in the '816 patent to Aylward et al. More particularly, FIG. 6A illustrates the brain vasculature and tissue envelope from the left side, FIG. 6B illustrates the brain vasculature and tissue envelope when viewed from the front, FIG. 6C illustrates the brain vasculature and tissue envelope when viewed from the bottom, and FIG. 6D illustrates the brain vasculature and tissue when viewed from the top. The extraction methods described herein are not limited to extracting the brain vasculature. The extraction methods described herein may be used to extract the vasculature and/or tissue in any region on interest within a subject.

ii. Computing a Distance Map

The reason for computing a distance map is to simplify mapping between the image data of different subjects. The computation of the distance map gives an image where the intensity value at each voxel is the distance from the closest vessel. This calculation can be performed using the algorithm developed by Danielsson, as described in the Danielsson publication referenced above. The intensity of a distance map can be also inverted to get an inverted distance map in which the brightest pixels are the nearest to vessel, and the intensity decreases further away from the centerline. This produces a blurred image of the vasculature. Rather than trying to map each individual details within blood vessel or tissue image data, the present implementation includes blurring the image data being mapped from and being mapped to. As a result, the mapping or registration of images is greatly simplified.

Figure 7A:
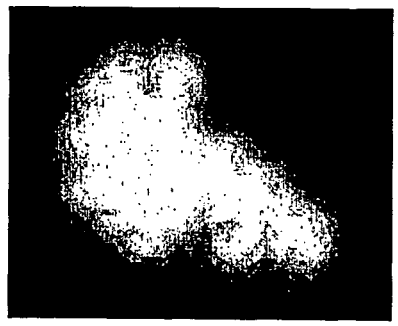
FIGS. 7A-7C illustrate exemplary Danielsson distance maps suitable for use in mapping blood vessel image data between members of a population.
Figure 7B:
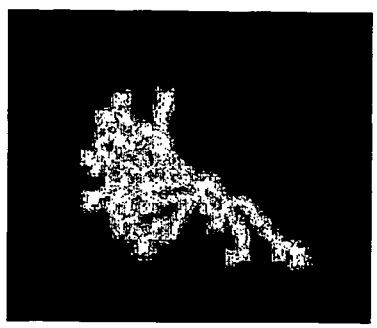
Figure 7C:
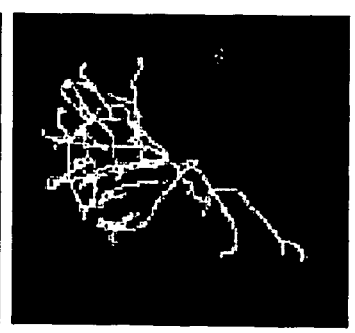

FIGS. 7A-7C illustrate inverted distance maps of the vasculature from a human liver. More particularly, in FIG. 7A, the inverted distance map was created by applying a threshold to voxel intensity values to show intensity fall off near the centerlines of each vessel. In the inverted distance map of FIG. 7B, a higher threshold is used so that only voxels immediately adjacent to the centerline are shown as bright voxels. In the inverted distance map of FIG. 7C, only voxels located at the vessel centerlines are assigned a non-zero intensity value. The blurred nature of the inverted distance maps in FIGS. 7A and 7B may be used to simplify mapping of complex objects, such as vessel-based objects.

iii. Vessel-to-Image Affine Registration

The process of mapping images of different subjects to each other is referred to as image registration. Registration includes the transform, the optimization process, and the match metric. The transform used in this method is a basic affine transform having a 12 dimensional parameter space. A 1+1 evolutionary optimizer as described by Steiner et al. in Steiner, M., Gary G., "Evaluation of 2D/3D Bias Correction with 1+1 ES Optimization," Technical Report, BIWI-TR-179, is used to perform the optimization. The one-plus-one evolutionary optimizer utilizes a normal distribution to randomly walk in parameter space to find a global maximum and update the covariance matrix of the normal distribution to converge to a solution. The vessel-to-image match metric measures how well an affine matrix R and an offset vector o, applied to a vascular model, align that model with an image. The metric is maximal when the centerline points $x_i$ of the model map to the scaled brightest pixels in the IDM. The following equation illustrates the vessel-to-image match metric:

$$F(R, o) = \frac{1}{\sum_{j=1}^{n} w_j} \sum_{i=1}^{n} \omega_i I_{kr_i}(Rx_i + o)$$

From this equation, the metric depends on the centerline sampling ($x_i$ and n) and the scale ($kr_i$) of the Gaussian used to blur the IDM (reducing the influence of the noise) (See Danielsson.) Additionally, the parameter $w_i$ can be used to weight samples depending on their radius $r_i$; weighting increases from $w_i=0$ at $r_i=0$ to an asymptote of $w_i \cong 1$ at $r_i \cong 3$. The following equation illustrates the relationship between $w_i$ and $r_i$.

$$\omega = \frac{2}{1 + e^{-2r_i}} - 1$$

A detailed discussion of the weighting parameters can be found in Danielsson and in the section below relating to formation of a vascular density atlas using tissue-based registration.

iv. Atlas Formation

Figure 8:
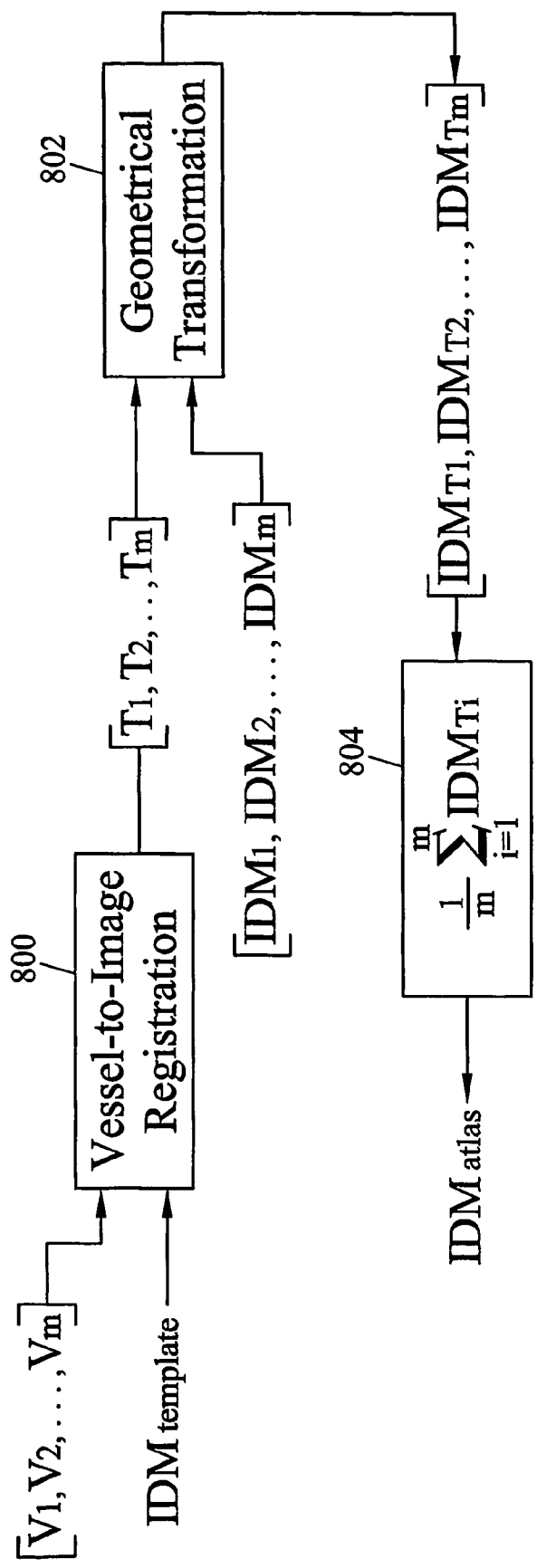
FIG. 8 is a flow diagram illustrating an exemplary process for generating a vascular density atlas using affine registration of Danielsson distance maps according to an embodied of the present invention.

The processing pipeline of the atlas formation can be divided in three steps. FIG. 8 is a block diagram of an exemplary processing pipeline of atlas formation. First, among the different vascular networks ($V_i$), one is chosen as an initial template. The chosen network's IDM is computed to get $IDM_{template}$. The remaining vascular networks are then registered with $IDM_{template}$ using the vessel-to-image affine registration process indicated by registration block 800. Those registrations provide n transform parameters ($T_i$), which are n translation vectors and n affine matrices. Second, the parameters ($T_i$) can be applied to each $IDM_i$ to transform them into a common coordinate system as indicated by transformation block 802. Thus, each $IDM_{Ti}$ is aligned with the template $IDM_T$. Third, the mean and the variance images from the ($IDM_{Ti}$) are calculated to form the atlas as indicated by block 804.

c. Results

The atlas formation method discussed in the previous section was used to generate vascular density atlases for human brains and livers. The atlases were then tested to quantify (1) the reliability of affine registration for vascular model to DM registration across patients, (2) the generalization of the ability of the atlases to accept subjects from the same population, and (3) the ability of the atlases to discriminate subjects from different populations.

Monte Carlo simulations were used to quantify the reliability of the affine registration process. One hundred registrations of a vascular model from one patient's liver with other patients' IDMs were performed. For each registration, the vascular model was initially displaced by an offset up to ±10 voxels (1 cm) and a rotation of up to ±0.15 rad (8.5°). The vascular networks of the patients where very different in terms of the number and position of vessels in their livers.

Figure 9A:
FIGS. 9A and 9B illustrate exemplary segmented blood vessel image data for the liver vasculature of two patients.
Figure 9B:

FIGS. 9A and 9B illustrate liver vasculature for two normal subjects. Liver vasculature includes two venous systems: the portal system (shown as bright vessels in FIGS. 9A and 9B), which brings blood into the liver and the hepatic system (shown as dark vessels in FIGS. 9A and 9B), which transports blood from the liver. As illustrated in FIGS. 9A and 9B, even in normal subjects, the vasculatures differ in vessel number and locations.

Initial experimentation resulted in separation of the liver vasculature networks to form two different atlases, one for the hepatic and the other for the portal system. For some subjects, these networks were so different that it was impossible to match hepatic and portal vessels together. Separating these systems resulted in very repeatable registrations and may allow atlases to detect more subtle venous-system-dependent anomalies, such as accessory renal veins.

Figure 10B:
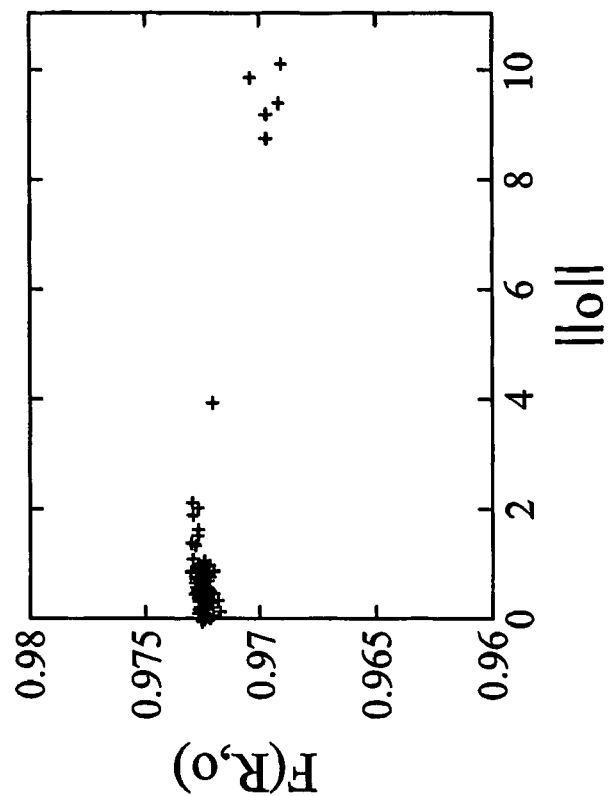
FIGS. 10A and 10B are graphs of a vessel-to-image mapping metric versus the Euclidian distance of an initial offset from the average offset for simulations run for hepatic and portal vascular density atlases.
Figure 10A:
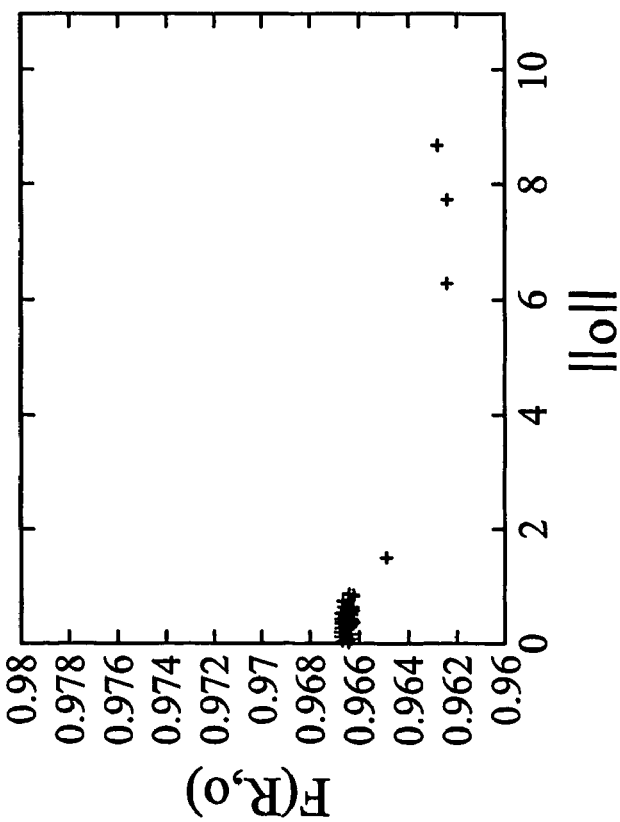

FIGS. 10A and 10B illustrate results from the Monte Carlo simulations. More particularly, FIG. 10A is a graph of the vessel-to-image mapping metric versus the Euclidian distance from the offset to the average value of the offset for hepatic-to-hepatic registration and FIG. 10B is a graph of the vessel-to-image mapping metric versus the Euclidian distance from the offset to the average value of the offset for portal-to-portal registration. From FIG. 10A, only five of one hundred instances failed to converge to a consistent solution for the hepatic system and only eight of one hundred failed to converge to a consistent solution for the portal system. These statistics, which are shown in Table 1 below, indicate a low standard deviation for the offset, even for the wide range of initial misregistrations (indicated by the different offset values) used.

TABLE 1

Simulation Results for Liver Atlas Registrations

| Registration | Ox | Oy | α |
| --- | --- | --- | --- |
| Hepatic-Hepatic system | μ = 14.8, σ = 0.24 | μ = 4.2, σ = 0.26 | μ = 8.2, σ = 0.24 |
| Portal-Portal system | μ = 5.5, σ = 0.46 | μ = 7.1, σ = 0.48 | μ = 121, σ = 0.47 |

Monte Carlo simulations where also conducted using an intra-cranial vascular networks from two patients. That is, a vascular density atlas was developed using the vessel-to-image affine registration method using IDMs described in this section. Simulations were then run for different offsets and different subject image data to determine whether the registrations converged to an optimal value for different initial misregistrations.

For the intra-cranial vessel density atlas, there was no need to split the vascular trees within the brain. The repeated registration of complete intra-cranial networks was as reliable of those of either of the venous systems in the liver. The intra-cranial atlas was tested based on its ability to describe the population from which it was formed. To form the intra-cranial vessel density atlas, nine MR angiograms of normal subjects were used. The fit between these individuals and the atlas was then computed. To quantify the fit, voxel-by-voxel z scores were computed for all subjects using the mean and variance vessel density estimates of the atlas. The z value indicates by how many standard deviations σ the intensity value at a voxel of an individual's DM differs from the mean intensity value μ at the voxel as captured in the atlas. The following equation illustrates the relationship between the z value or z score, the intensity value $x_i$ at a voxel i in an IDM, the mean intensity value for the atlas, and the standard deviation of the intensity for the same position in the atlas.

$$z_i = \frac{x_i - \mu_1}{\sigma_i}$$

Once the z score is calculated for each voxel, a mask is used to limit z score calculation to the volume covered by an individual's scan. Having a z-score value at each voxel allows local statistical anomalies to be detected. Calculating the histogram of z scores within an individual's scan supports global comparison across individuals as well as the verification that the population is well represented by a normal distribution. Table 2 shown below illustrates z-score distributions for individuals that were used to form the atlas.

TABLE 2

Percentage of Voxels for Different Subjects Having Z-Score Values within 4, 1, and 2 Standard Deviations from Atlas

| Percentage of voxels basing their z-score | $z \leq 0.4\sigma$ | $z \leq 1\sigma$ | $z \leq 2\sigma$ |
| --- | --- | --- | --- |
| Normal001 | 61% | 93% | 100% |
| Normal002 | 43% | 98% | 100% |
| Normal003 | 46% | 86% | 93% |
| Normal004 | 47% | 98% | 100% |
| Normal005 | 30% | 89% | 99% |
| Normal006 | 47% | 96% | 100% |
| Normal007 | 44% | 94% | 100% |
| Normal008 | 51% | 96% | 99% |
| Normal009 | 49% | 99% | 100% |
| New Normal | 51% | 97% | 99% |
| AVM Case | 10% | 36% | 80% |

From Table 2, the results indicate that the atlas represents the population well, and the population has a normal distribution. For example, for almost all of the individuals, over 85% of the voxel intensities were within one standard deviation in intensity from the mean intensity of the corresponding voxels of the atlas. However, an abnormal distribution of z scores was measured in one individual, indicated by the row labeled "Normal003." A review of that individual's anatomic and vascular data suggested a small physical deformation.

As a further test of how well the atlas represents a population, a tenth normal subject was registered with the atlas and given z scores. This individual was considered to have a normal vasculature by a neurosurgeon but was not used to form the atlas. The z scores for this individual are indicated by the row labeled "New Normal" in Table 2. The scores are well correlated with the scores from the individuals who are used to form the atlas. This indicates that the atlas does effectively represent the population.

Figures 11A, 11B:
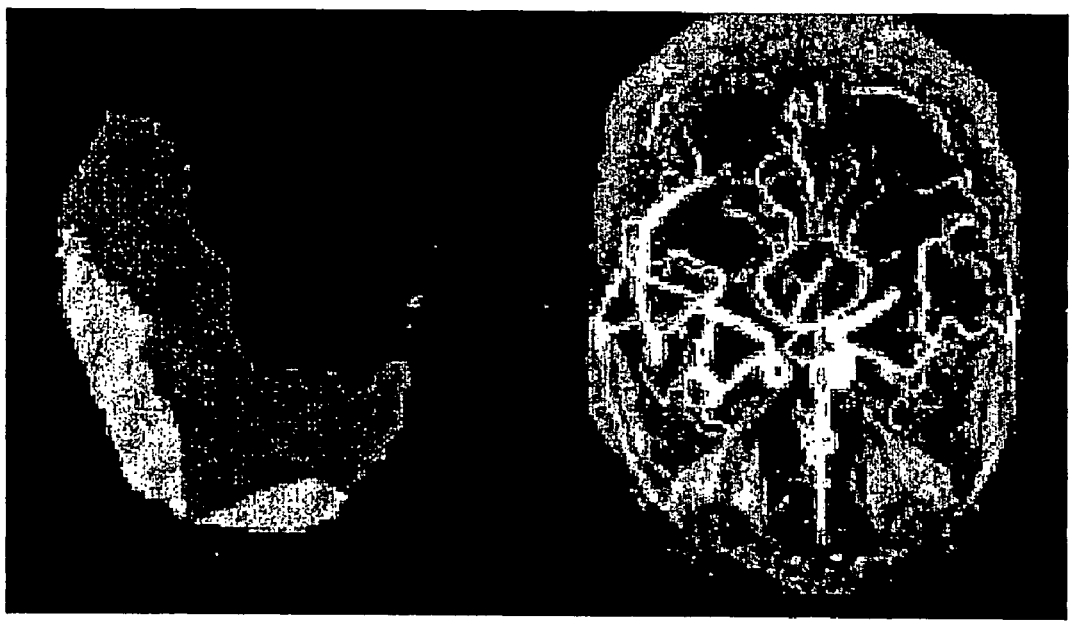
FIG. 11A is diagram in which shading illustrates z-score values for the brain image in FIG. 11B.
FIG. 11B is an MRA image of a brain having a venous anomaly on the left side.

Yet another validation of the atlas focused on its ability to differentiate an individual that belongs to a different population. This was tested using MRA data from an individual with an arterio-venous malformation. The data was registered with the atlas. The corresponding z-score values were calculated. Those results are illustrated by the AVM case in Table 2 and in FIGS. 11A and 11B. In FIG. 11A, z-score values for z=0, z=1, and z=2 are shown respectively, by black, gray, and white voxels. These values suggest an anomaly on the left side of the brain, which is verified the MR angiogram of the brain illustrated in FIG. 11B.

In an implementation of an automated blood vessel attribute analysis system, an individual whose voxel-by-voxel z-score values differ significantly from other members of the atlas may be flagged for further consideration. For example, the individual may first be compared to an atlas of normal patients. If the individual is determined to have z scores distributions that differ from those of the, the individual may be compared to an atlas of patients having a particular disease. Alternatively, the patient's anatomic and vascular data may be analyzed manually by a physician.

d. Discussion and Conclusions

Thus, a vascular atlas can be formed by registering vascular models. The basis of registration is the calculation of a vascular distance map and the application of a vascular model-to-image affine registration technique.

The application of the intra-patient vascular registration and atlas formulation method is demonstrated using portal venous networks, hepatic venous networks, and intra-cranial vasculatures. Monte Carlo experiments quantify the reliability of the registration process for liver and intra-cranial networks. Furthermore, the intra-cranial atlas is able to correctly differentiate the vascular network from a healthy individual from a vascular network from an individual who previously had an arterio-venous malformation. The location of that lesion within the individual was also correctly identified via the atlas.

3. Alternate Method for Vascular Atlas Formation Using Tissue-Based Affine Registration and Representative Population Member as Initial Template a. Introduction In section III.E.2 above, a method for generating a vascular attribute atlas using vessel-based registration was described. In this section, a method for generating a vascular density atlas using tissue-based affine registration will be described. Either method may be implemented by a system for automated blood vessel attribute analysis according to an embodiment of the subject matter described herein. The method described in this section relates to creation of a vascular density atlas for the brain. However, this method may be used to form a vascular density atlas for any anatomical region of interest so that the corresponding vasculature can be analyzed.

Creation of an average 3-dimensional standardized brain and modeling its common variations is important both clinically and in research. An atlas of the brain establishes a generalized societal form and has multiple benefits, including use as a statistical prior for effective assessment of aberrations within individuals. Numerous types of anatomical atlases have been formed. These atlases are effective tools for tissue-based analysis; however, they fail to illustrate the cardiovascular network of the brain.

Generation of a tool to assess cranial vascular distribution has both clinical and research applications. Medical applications include pre-operative planning and diagnosis, identification of vascular anomalies, and assessment of an individual's vascular changes over time. Such a tool may also aid in diagnosis of mental disorders, such as schizophrenia, that have a strong genetic component; embryological research suggests that the formation of the cranial vascular system precedes tissue development and potentially drives its structural formation (Seydel C., "Organs Await Blood Vessels' Go Signal," Science, 291:2365 (2001)), making it a possible determinant of cranial anatomy and a possibly more direct measure of the genetic component of such mental disorders. An atlas of vasculature may also be advantageous for stroke assessment—identifying affected regions, analyzing vascular malformation, and estimating arterial compensation. Finally, a vascular atlas may be used in conjunction with an anatomical atlas for additional verification and statistical validation.

This section proposes the formation of a vascular atlas as a valid and effective tool for measuring expected cerebral vessel distribution and illustrates its accuracy in estimating a societal average and variations. Forming the average vascular matrix within brain matter may not only be useful for identifying subtle changes in vessel formation not visible through standard tissue analysis, but it may also effectively imply tissue abnormalities through underlying vascular irregularity. Construction of the proposed vascular atlas involves tissue-based anatomical registration of density maps for an individual's cranial vessels, resulting in a mean vascular density atlas with expected variance. This approach is advantageous for the parallel formation of accurate, correlated anatomic and vascular atlases for tissue-based analysis.

b. Methods

Various registration techniques can be used for vascular atlas formation. The present solution is based on a tissue-based correlation of individual brains using mutual-information registration (Viola P., Wells III W. "Alignment by Maximization of Mutual Information," International Journal of Computer Vision, 24(2):137-154 (1997) and Hill D., "Medical Image Registration (2000)) applied through affine transformations. Transforms from tissue alignment are then applied to corresponding vessel density maps to form a vascular mean with expected variance.

The atlas formation technique described in this section requires a set of brain normals containing mutually aligned T2 MRIs and Magnetic Resonance Angiograms (MRA). For the present experiment, a rigid body transformation of individuals' T2 images onto their corresponding MRAs ensured proper correlation between the two images (Guyon J. P., Foskey M., Kim J., Firat Z., David B., Aylward S. R., "VETOT, Volume Estimation and Tracking Over Time: Framework and Validation," MICCAI 2003, (March 2003)). Since both scans were acquired in one sitting, it is reasonable to expect negligible brain distortion between the images.

i. Vessel Extraction

Formation of the vascular density map preferably includes extraction of all arterial vessels visible within a subject's MRA. The vessel segmentation solution in this experiment utilizes a centerline traversal approach, as described in Aylward S., "Vascular Image Registration for Intra-Operative Ultrasound Annotation," International Journal of Computer Vision (March 2003). This method executes a multi-scale traversal of a vessel's centerline, initiated from a point found on or near the tube. The radius of the vessel is then estimated using that centerline (Aylward S. R., Bullitt E., Pizer S. M., Eberly D., "Intensity Ridge and Widths for Tubular Object Segmentation and Registration," IEEE Workshop on Mathematical Methods in Biomedical Image Analysis, pp. 131-138 (1996) and Aylward S. R., Bullitt E., "A Comparison of Methods for Tubular-Object Centerline Extraction," IEEE Transactions on Medical Imaging, 21(2), pp. 61-76 (2002)).

During vessel modeling, only cerebral arteries, not veins, were gathered. This was done to improve the standardization of the vessel trees, since the image intensity of arterial vessels was more consistent across subjects' MRAs, when compared to veins. It is acknowledged that visual extraction of arteries is not exhaustive nor guaranteed to draw all available vessels; however, with meticulous segmentation attention and averaging of multiple vascular trees, such limitations fall within a reasonable range of uncertainty. Clean MRA scans are preferable for proper vascular tree collection.

ii. Formulation of Density Map Images

After vascular tree segmentation, the Danielsson distance (DD) algorithm as described in Danielsson is applied to the vessels, to generate a Euclidean distance field. The DD algorithm systematically generates an image for which each voxel contains the Euclidean distance to the nearest vessel. The distance maps represent vascular density images, by identifying probabilistic vessel locations as opposed to absolute binary vessel definitions. This approach forms clouds of expected vascular existence, which when combined with other density maps generates the average expected vascular density for a normal brain.

iii. Atlas Registration and Generation

The vascular atlas is formed using tissue-based mutual-information registration (Viola P., Wells III W., "Alignment by Maximization of Mutual Information," International Journal of Computer Vision, 24(2):137-154 (1997)). Using Parzen windows for estimating probability density distributions, the mutual-information applies an affine transform to the T2 weighted image to align it with the atlas template. Initially, each T2 brain image is registered to a single brain that is used as the atlas template. An anatomical atlas is formed through summation of the registered images to form a mean. This procedure is repeated using the newly formed atlas as the atlas template in order to remove bias toward the originally template individual. Repetition of this cycle gradually moves toward an unbiased, general atlas. After satisfactory formation of a general atlas, the affine transformations from the tissue registration are applied to their corresponding vascular density map to align each field properly in the anatomical match. Combining the aligned fields forms the vascular mean and expected variance.

iv. Assessment and Evaluation

To assess the validity of the vascular atlas for estimating intra-cranial vasculature, individuals' distance fields were compared with the vascular atlas using voxel-by-voxel scoring. Evaluating on a per voxel basis allows regions of statistical deviation within an individual's distance field to be localized. These scores are then used to quantify global differences through the subjects.

To form the standard distribution, z-score analysis was used to estimate an individual's adherence to the atlas. The z score is calculated using the following formula:

$$z_v = \frac{x_v - \mu_v}{\sigma_v}$$

where $x_v$ represents an individual's brain intensity at location v, $\mu_v$ represents the mean atlas intensity for that location, and $\sigma_v$ represents the standard deviation for that voxel.

A large z-score value indicates a statistical anomaly at that voxel for an individual. Gaussian distributed populations can be assessed based on the z-score distribution within and across individuals. Computed for each individual, this process allows identification of outliers with subtle vascular variation.

c. Results

Figure 12:
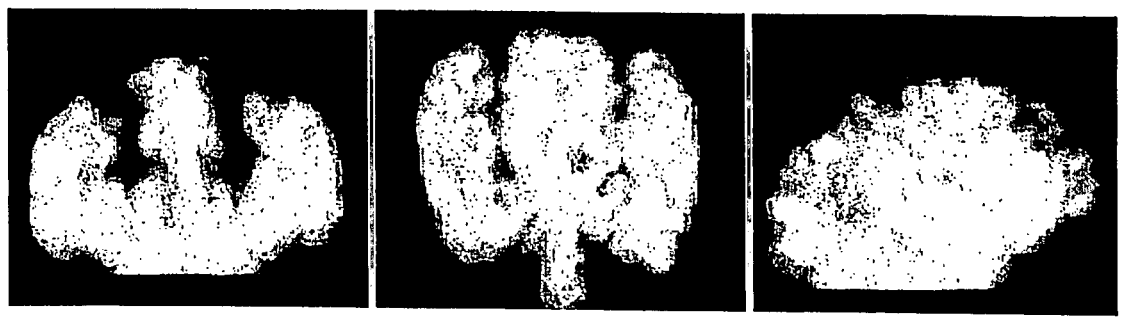
FIG. 12 illustrates coronal, axial, and sagittal maximum intensity projections of a brain vascular density atlas formed through tissue-based affine registration of nine subjects.

FIG. 12 illustrates coronal, axial and sagittal maximum intensity projections of the vascular density atlas formed through tissue-based registration of nine subjects. The vascular cloud segments for the left and right hemispheres and medial arteries are clearly defined and distinct. Cranial shape is evident and locations of large structures, such as ventricles, are implied within the vascular spaces.

Table 3 shows the z-score results indicating the percentage of an individual's voxels that deviate from the vascular atlas. Table 4 shows percent deviation from the anatomical atlas. The statistical expectation for normal distribution is indicated as well in both measures. Most subjects' vascular maps fall within the expected normalized deviation the atlas. Two vascular outliers, subjects 09 and 04, illustrate the atlas capability of identifying subtle changes in vasculature and are illustrated in FIG. 13 where deviation images highlighting deviant areas are compared with conforming subjects 05 and 08.

Figure 13:
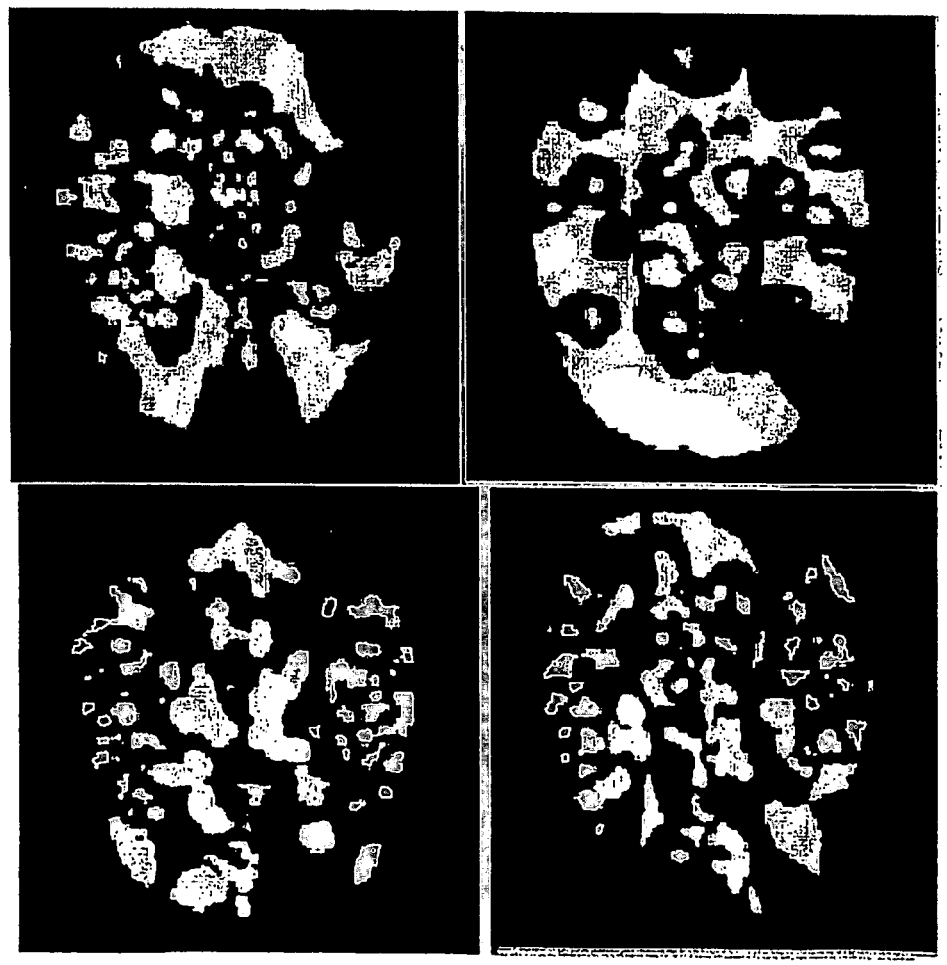
FIG. 13 includes images in which shading indicates different z-score values generated by registering different patients' vascular image data with a vascular density atlas.

In particular, the shading in FIG. 13 illustrates vascular density z-score distribution. FIG. 13, black shading indicates a z-score value of 0 to 0.9, gray shading indicates a z-score value from 1 to 1.9, and white indicates a z-score score value greater than 2. The top row of images in FIG. 13 illustrates z-score values for deviant individuals. In particular, the top left image corresponds to the z-score values for individual 04 in Table 3. The top right image corresponds to individual 09 in Table 3. The bottom row of images in FIG. 13 corresponds to conforming individuals. In particular, the bottom left image corresponds to individual 05 in Table 3. The bottom right image corresponds to individual 08 in Table 3. Thus, from FIG. 13, it can be seen that computing z-score values based on individual comparisons to a vascular density atlas can locate regions of vascular abnormality.

TABLE 3

Z-Score Distributions for Different Individuals when Compared to Vascular Atlas Standard Deviations

| Subject | 0.2 | 0.6 | 1.0 | 1.4 | 1.6 | 2.0 |
|---|---|---|---|---|---|---|
| 01 | 15.10 | 44.10 | 68.48 | 85.54 | 91.04 | 97.42 |
| 02 | 15.49 | 44.78 | 69.16 | 86.67 | 92.30 | 98.36 |
| 03 | 15.60 | 46.32 | 73.17 | 89.80 | 94.42 | 98.80 |
| 04 | 13.03 | 38.49 | 62.06 | 80.62 | 87.37 | 96.35 |
| 05 | 16.19 | 47.45 | 73.60 | 90.54 | 94.99 | 99.17 |
| 06 | 16.41 | 47.43 | 73.03 | 89.87 | 94.71 | 98.99 |
| 07 | 15.26 | 44.49 | 69.72 | 87.41 | 92.82 | 98.35 |
| 08 | 15.56 | 45.58 | 71.11 | 88.43 | 93.30 | 98.55 |
| 09 | 11.48 | 33.60 | 54.38 | 72.50 | 80.26 | 92.11 |
| Normal Dist | 15.9 | 45 | 68 | 84 | 89 | 95.4 |

TABLE 4

Z-Score Distributions for Different Individuals when Compared to Anatomical Atlas Standard Deviation

| Subject | 0.2 | 0.6 | 1.0 | 1.4 | 1.6 | 2.0 |
|---|---|---|---|---|---|---|
| 01 | 12.92 | 47.96 | 76.76 | 90.18 | 93.50 | 97.26 |
| 02 | 13.04 | 45.97 | 71.88 | 85.21 | 89.11 | 94.34 |
| 03 | 14.98 | 48.53 | 69.95 | 81.74 | 86.12 | 93.03 |
| 04 | 10.65 | 39.69 | 67.70 | 85.42 | 90.24 | 95.69 |
| 05 | 16.21 | 53.12 | 75.46 | 86.99 | 90.84 | 95.93 |
| 06 | 13.14 | 48.04 | 74.35 | 86.87 | 90.52 | 95.48 |
| 07 | 11.93 | 45.13 | 75.83 | 90.85 | 94.23 | 97.70 |
| 08 | 12.22 | 45.06 | 72.82 | 86.64 | 90.55 | 95.58 |
| 09 | 11.93 | 44.68 | 73.74 | 89.43 | 93.24 | 97.22 |
| Normal Dist | 15.9 | 45 | 68 | 84 | 89 | 95.4 | d. Discussion

The generated vascular density atlas showed tight formation and distinct brain segments representing different lobe vasculature. While the vascular branches formed clouds of probable density as opposed to distinct vessels, the major branches and vascular structures, such as the Circle of Willis, were clearly visible within the atlas. Additionally, structural anatomic silhouettes of the skull, ventricles, and spinal base were visible within the vascular atlas, which was to be expected as the atlas was formed through tissue registration. Qualitative results indicate a reasonable alignment of tissue and vascular tubes for formation of parallel creation. Quantitative validation of the vascular atlas through individual comparisons showed a normal deviation distribution for most subjects. Z-score analysis illustrated a largely normalized fit of subject vessels to the atlas. The deviation of individual vascular images from the calculated mean fell within a normalized distribution fit outside of 0.4 deviations. Inside of 0.4 deviations, the accuracy fell slightly below a normalized distribution, which can expected since the atlas registration is tissue-based, as opposed to vascular. It is interesting to note, however, that in almost all cases the vascular atlas had greater percentages within 0.2 deviations than the tissue atlas. This is largely due to higher contrast within tissue images, as opposed to the gentle gradient slopes formed in a Euclidean distance field.

Vascular outliers were present and indicate subtle arterial variations from the general population. Z-score analysis of subject 09 showed heavy vascular deviation in the anterior lobe of the brain and further examination of the subject's vascular tree verified that anterior vessel formation was less pronounced within the individual. While other factors such as diminished arterial flow during the MRA scan could conceivably have caused this anomaly, the arterial prominence in other vessels of the scan support the integrity of the scan. Regardless, the result illustrates the atlas' ability to identify incongruent vasculature otherwise not visibly apparent. Anatomical analyses indicated no significant variation of subject 09 from the tissue atlas; suggesting either a complete lack of physical manifestations of the vascular anomaly within the tissue, or more likely that such tissue deviations are not easily identifiable through tissue comparison. This further suggests the atlas' analytical potential for identification of cranial diseases and abnormalities.

Subject 04 also demonstrated vasodeviation, this time coupled with anatomic irregularity. A slight physical deformation in subject 04's visual anatomy was apparent in anatomic deviation around the anterior brain. Heavy vascular deviation in the vicinity of the aberration identified a manifested vascular shift, due to the physical abnormality. It is also important to note that localized vascular deviation was evident within the visual cortex and other parts of the occipital lobe, supporting the possibility of modifications in the visual sensory processing region of the cortex which would be expected given the subjects physical abnormality.

This experiment suggests that formation of a brain vascular atlas is a valid tool for estimating a societal norm. Conclusive results may require collection of additional subjects to form a tighter fitting atlas representative of a larger portion of society. Regardless, the results of this study indicate a correlation between the brain's vasculature and tissue composition. The subject-to-atlas comparisons not only accurately identified abnormal individuals, but also highlighted potential diagnostic advantages of a vascular atlas.

F. Blood Vessel Attributes

As described in Section III.A., blood vessels can be modeled using intensity data and extracted vessel trees. From these models, blood vessel attributes can be determined. These attributes can be calculated for populations of individuals and used for disease diagnosis, disease staging, and surgical planning. For example, an atlas can be developed on the basis of one or more of these attributes and used to compare to an individual's attributes to detect abnormalities. In the preceding two sections, examples of blood vessel density atlases were presented. In this section additional measures, such as tortuosity and count of terminal branches, each of which may form the basis of a vascular atlas will be described.

1. Tortuosity Types

One attribute that may be particularly useful in forming a vascular atlas is tortuosity. Typically, vessels of diseased tissue are abnormally tortuous. As such, it is desirable to develop measures for quantifying normal and/or abnormal tortuosity that can be incorporated into an atlas and used for diagnostic purposes.

Vessels can be grouped into three patterns of abnormal three-dimensional vascular tortuosity, each associated with a different disease process. Herein, these abnormal patterns are referred to as types I, II, and III. Table 5 below provides a summary of these three types of abnormality. Length refers to the length of the affected vessels. A description of amplitude and frequency is provided hereinbelow.

TABLE 5

Abnormal Tortuosity Types

| Type | Length | Amplitude | Frequency | Comment |
|---|---|---|---|---|
| I | Long | High | Low | Sinuous curves in long, normally straight vessels |
| II | Variable | Medium | Medium | Tightly packed cluster; erratic directional changes |
| III | Variable | Low | High | Tight coils or sine wave |

Tortousity type I occurs when a normally straight vessel elongates to such that a normally straight or gently curved vessel forms a broad "C," "S," or repeated "S" shape. This type of abnormal tortuosity is typically associated with aging, hypertension, atherosclerosis, retinal disease of prematurity, and with a variety of diseases such as hereditary diseases that affect the vessel wall. Type I is also associated with risk of vessel thrombosis and stroke.

Figure 14:
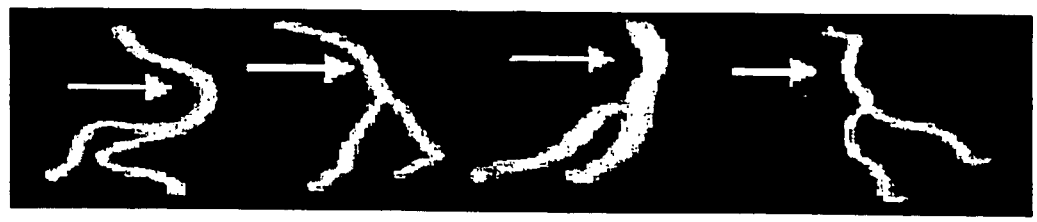
FIG. 14 illustrates images of paired vertebral arteries and a basilar artery having type I tortuosity.

FIG. 14 illustrates images of paired vertebral arteries and the basilar artery of a subject that has type I tortuosity. The abnormal case is shown at the far left of FIG. 14, and the vessels of three normal subjects in the three images at the far right. Arrows point to the basilar artery, which, in the abnormal subject, are so severely tortuous that it produced cranial nerve deficits.

Tortuosity type II abnormalities typically occur in the presence of highly vascular tumors and within the nidi of arteriovenous malformations (AVMs). Abnormal vessels are typically packed within a small volume of space and exhibit frequent and unpredictable changes of direction. Successful treatment with anti-angiogenic factors can reduce the tortuosity of the vessels within the affected region, suggesting that quantitative measurements of tortuosity may be helpful in monitoring treatment.

Figures 15A, 15B, 15C:
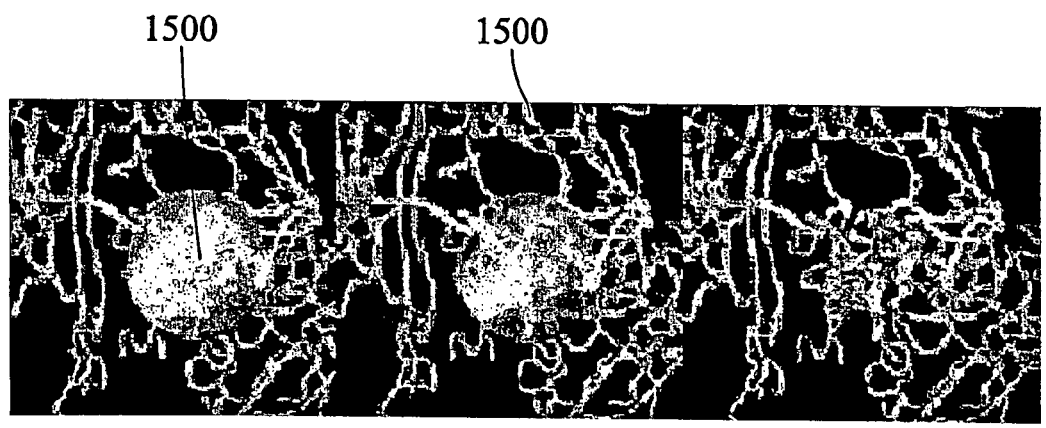
FIGS. 15A-15C are images of an arteriovenous malformation (AVM) nidus illustrating an example of type II tortuosity.

FIGS. 15A-15C are exemplary images of an AVM nidus 1500. In this example, curved vessels of variable length are packed together. Vessels within tumor nidus 1500 can be shown in a first color, such as red. Vessels supplying or passing through nidus 1500 can be shown in the images using a second color, such as gold. Normal vessels outside nidus 1500 can be shown in a third color, such as blue. The nidus of FIG. 15A is volume rendered at full opacity. The nidus of FIG. 15B is volume rendered at partial opacity. FIG. 15C shows the vessels alone.

Tortuosity type III abnormalities are typically apparent in malignant brain tumors when imaged by high resolution MR. These abnormal vessels are of variable length, may be straight or curved, but exhibit high frequency coils. The ability to quantitate such abnormalities can provide for identifying foci of active tumor growth as well as enable monitoring of anti-tumor therapy.

Figures 16A, 16B, 16C:
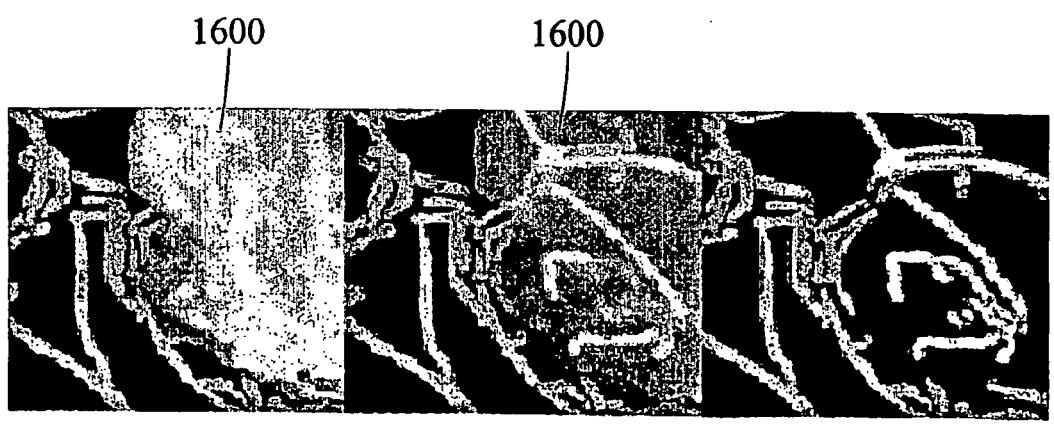
FIGS. 16A-16C are exemplary images of a subject with a malignant glioma illustrating an example of type III tortuosity.

FIGS. 16A-16C are exemplary images of a subject with a malignant glioma. Vessels entirely within tumor 1600 can be shown in a first color, such as red. Vessels partially within the tumor 1600 can be shown in a second color, such as gold. Normal vessels outside the tumor can be shown in a third color, such as blue. The vessels located entirely or partially within the tumor exhibit high frequency, low amplitude coils or sinusoidal patterns. Tumor 1600 of FIG. 16A is volume rendered at full opacity. In FIG. 16B, tumor 1600 is volume rendered at partial opacity. FIG. 16C shows the vessels alone.

2. Imaging, Segmentation, and Registration Methods Suitable for Evaluating Tortuosity In order to incorporate tortuosity metrics into a vascular atlas, blood vessel images must be obtained, segmented, and registered as described above. Imaging may be performed using any of the imaging methods described above. Segmentation may be performed using the method defined by Aylward et al. in the above-referenced '816 patent where vessels are defined by a set of directed, four-dimensional points indicating the sequential spatial position of each vessel skeleton point and an associated radius at each point. The vessel skeleton is defined as a spline, which may be sampled at regularly spaced intervals. Through experimentation with synthetic data, it was determined that a sampling distance of one voxel is suitable for evaluation tortuosity, because this interval allowed adequate estimation of vessel arc length while avoiding noise that can appear with sub-voxel sampling.

Registration may be performed by alignment of corresponding tissue or vessels. For example, for large named vessels, such as the basilar artery, corresponding sections of the artery may be aligned in the image data of different individuals. For tumors and AVMs, the abnormal vasculature prevents direct mapping of named vessels. In such instances, lesion boundaries may be defined and tortuosity may be evaluated for all vessels or vessel segments lying within the region. The same anatomical region may be defined within healthy patients, and tortuosity may be evaluated within the region. Methods for quantifying and comparing tortuosity will now be described.

3. Tortuosity Metrics

In order to incorporate tortuosity into a vascular atlas framework, it is necessary to quantify tortuosity into measurements that can be determined from blood vessel image data and used in statistical calculations and comparisons. Exemplary tortuosity metrics suitable for use with embodiments of the subject matter described herein include the distance metric (DM), the sum of angles metric (SOAM), and the inflection count metric (ICM). Each of these metrics will be explained in the sections below. In the sections below, vectors are indicated in bold font and points in italicized font. "n" indicates the number of points in a curve. $P_k$ indicates the vessel skeleton point "k." $P_0$ indicates the first point of any curve, and $P_{n-1}$ indicates the last point.

a. Distance Metric

Figure 17:
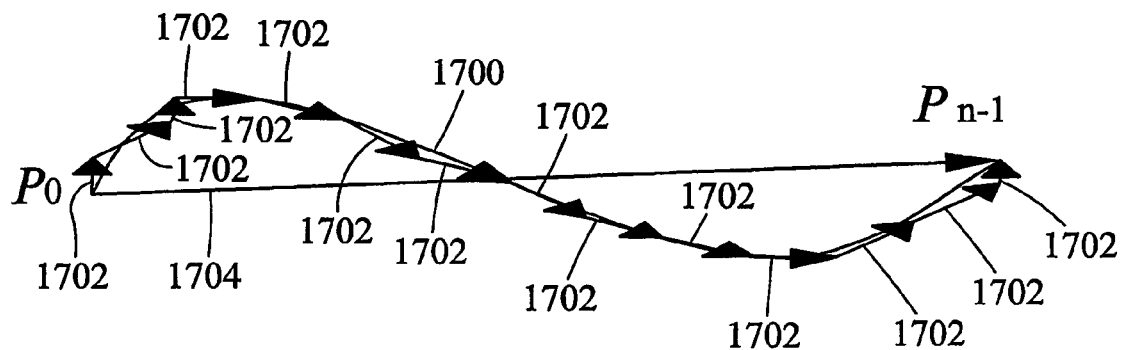
FIG. 17 is a graph of a distance metric (DM) applied to an exemplary vessel path.

The distance metric can be used to evaluate tortuosity in two and three dimensions. The distance metric is a ratio of the actual path length of a meandering curve and the linear distance between endpoints of the curve. FIG. 17 is a graph of a distance metric applied to an exemplary vessel path. Referring to FIG. 17, curved line 1700 represents a vessel path that starts at a three-dimensional point $P_0$ and ends at a three dimensional point $P_{n-1}$. The distances between adjacent points along the curved vessel path are indicated by short arrows 1702. The straight-line path between vessel endpoints is indicated by line 1704. The distance metric may be calculated by dividing the sum of the lengths of arrows 1702 by the length of line 1704.

b. Inflection Count Metric

While the distance metric is suitable for quantifying the tortuosity of a large-radius curve, it fails to capture the tortuosity of multiple small-radius curves that may occur in a blood vessel. The inflection count metric is intended to solve this problem. The inflection count metric results from the multiplication of the distance metric by the number of inflection points between curve endpoints. For a three-dimensional space curve, an inflection point is defined as a locus that exhibits a minimum of total curvature. One method for identifying inflection points is utilizes Frenet frames. In particular, the normal and binormal axes of the Frenet frame, as described in J. J. Koenderink, *Solid Shape*, Cambridge Mass: MIT Press, pp 167-194 (1993), may change orientation by about 180 degrees as the frame passes through an inflection point. As a result, the three-dimensional inflection point can be determined by identifying large local maxima of the dot product $\Delta N \cdot \Delta N$, where N is the unit vector representing the Frenet normal axis, and $\Delta N$ represents the difference of the normal axes associated with points $P_k$ and $P_{k1}$.

Figures 18A, 18B:
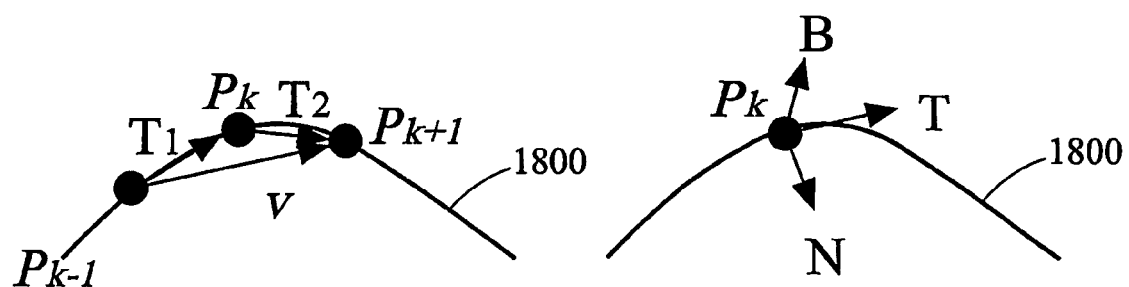
FIGS. 18A and 18B are space curves for determining inflection count metric (ICM) of a vessel as a measure of tortuosity.

According to one implementation, a geometric implementation of the Frenet frame can be utilized for identifying inflection points. FIGS. 18A and 18B illustrate a geometric method for identifying Frenet frame coordinates from velocity and acceleration vectors associated with the rate of change in curvature of a vessel segment. In FIG. 18A, line 1800 is a space curve that may represent a section of a blood vessel. The velocity vector V at point $P_k$ on curve 1800 can be approximated by the vector between the points $P_{k-1}$ and $P_{k+1}$. The acceleration vector A at point $P_k$ is approximated by subtracting the vector T1 from the vector T2, where T1 and T2 are vectors between sample points on curve 1800.

FIG. 18B illustrates the derivation of Frenet frame coordinates at the point $P_k$, given the velocity and acceleration vectors. Referring to FIG. 18B, The Frenet tangent axis, T is a unit vector in the same direction as the velocity vector and is calculated by normalizing the velocity vector. The Frenet normal axis, N, can be derived by crossing the velocity and acceleration vectors (producing an out-of-plane vector at right angles to both), and then crossing that vector with the velocity vector and normalizing. The result is a unit vector in the same plane as both the velocity and acceleration vectors and orthogonal to the tangent vector T. The third Frenet coordinate is the binormal axis B. The binormal axis B can then be derived by crossing T and N. The following equations illustrate the relationships between the Frenet frame coordinates and the velocity and acceleration vectors.

$$A = T_2 - T_1$$

$$T = V/|V|$$

$$N = V \times A \times V / |V \times A \times V|$$

$$B = T \times N$$

One problem with the Frenet frame is that the Frenet frame is undefined when the acceleration vector has no length, as occurs at inflection points or during passage over a straight line. This problem can be handled by checking the length of the acceleration vector, and determining whether this length is less than $10^{-6}$ cm. If so, the point can be skipped and the frame redefined at the next vessel sample point.

Figure 19A:
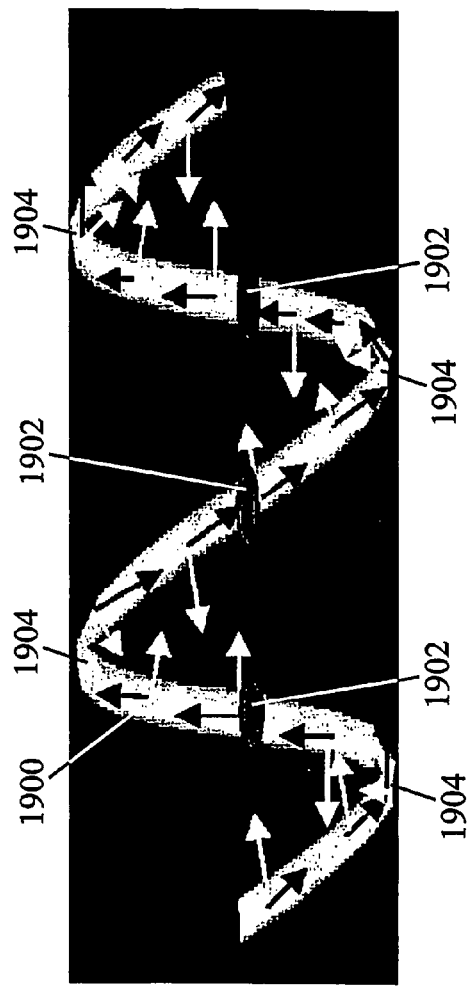
FIGS. 19A and 19B are a diagram and graph, respectively, illustrating an example of the calculation of inflection points in a three-dimensional test object.
Figure 19B:
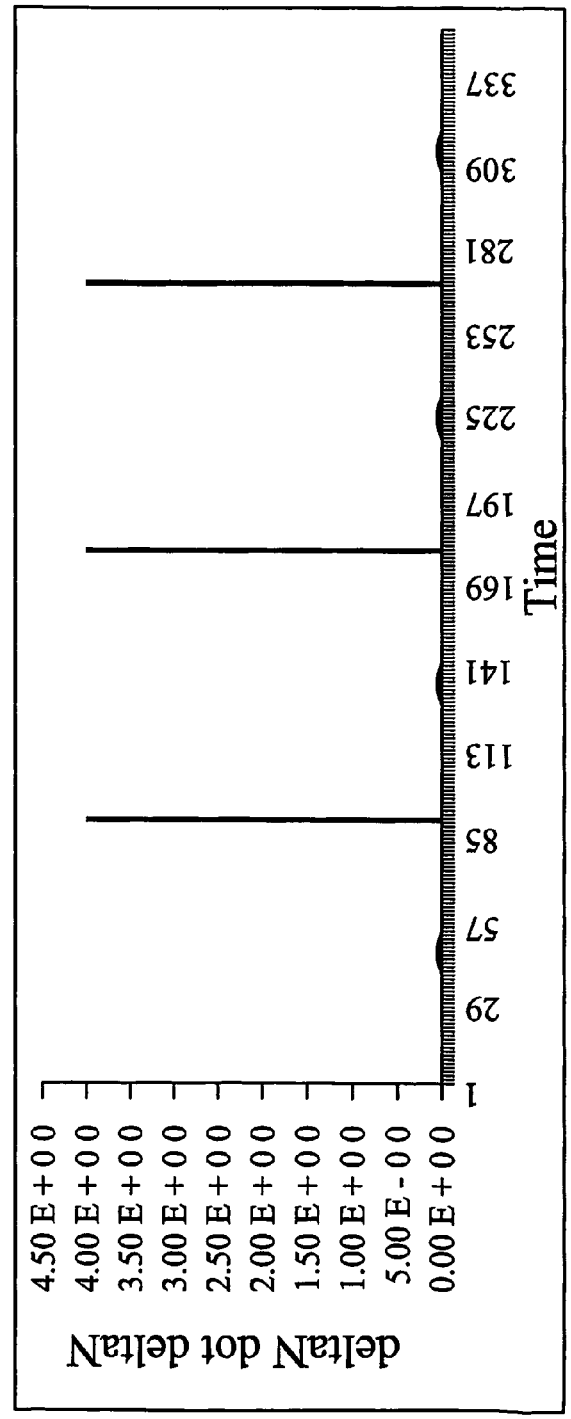

FIGS. 19A and 19B are a diagram and graph, respectively, illustrating an example of the calculation of inflection points in a three-dimensional test object. In FIG. 19A, sinusoidal curve 1900 contains three inflection points 1902 and four extrema 1904. The black arrows along curve 1900 represent Frenet T axis vectors and the white arrows represent Frenet N axis vectors. The direction of the unit vector N rotates close to 180 degrees after passing through each inflection point 1902, such that the length of $\Delta N$ at these locations is close to 2.

FIG. 19B is a graph showing the squared length of each $\Delta N$ versus time. As shown, passage through an inflection point produces a large signal with $\Delta N \cdot \Delta N$ approximately equal to 4.0, whereas the values at other locations are in the range of $10^{-2}$ to $10^{-8}$. The four small peaks occurring midway between the very large inflection point peaks have a value of 0.01, and correspond to the space curve's four minima and maxima, where the N vector changes orientation rapidly without "flipping over." Passage through an inflection point is recognized by searching for local maxima of ΔN·ΔN when ΔN·ΔN is greater than 1.0.

If the number of inflection points is 0, the ICM can report no tortuosity even if the curve makes a large arc. Therefore, a value of one can be added to the calculated inflection count. Both a straight line and a coil are reported as having inflection counts of one. The ICM multiplies the distance metric by the inflection count, using a minimum inflection count of one. The ICM will not have a value less than the distance metric and may always be an integral multiple of the distance metric. As compared to the DM, the ICM is more sensitive to oscillating curves and will report an oscillating curve as more tortuous than a curve with the same total length and endpoints but that makes a single large "C."

c. Sum of Angles

One disadvantage of both the distance metric and inflection count measurement is that neither method handles tight coils well. Since high frequency, low amplitude coils do not add greatly to the total path length, the distance metric regards such highly torturous curves as close to straight and assigns a low tortuosity value. As coils do not contain inflection points, the inflection count measurement does no better than the distance metric when analyzing coils and reports the same tortuosity values.

An alternative approach to measuring tortuosity that is particularly suitable for measuring tortuosity of high frequency, low amplitude coils is the sum of angles metric (SOAM). The sum of angles metric integrates total curvature along a curve and normalizes the curvature by path length. The approach described below for computing a sum of angles metric provides a 3D, geometrically based variant of the curvature integration method described in Hart et al., "Measurement in Classification of Retinal Vascular Tortuosity," Int. J. Medical Informatics, vol. 53, pp. 239-252 (1999).

Figure 20:
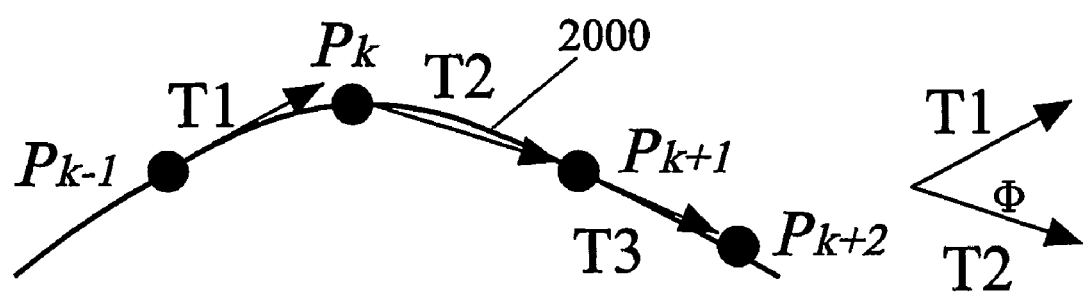
FIG. 20 is a diagram illustrating exemplary vectors and angles used in calculating a sum of angles metric (SOAM) of tortuosity.

FIG. 20 is a diagram illustrating an exemplary geometric method for computing the sum of all angles metric. Referring to FIG. 20, it may be desirable to determine the sum of angles at each sample point on a curve 2000. In particular, the in-plane curvature at point $P_k$ may be estimated by calculating the vector T1 between points $P_{k-1}$ and P and the vector T2 between points $P_k$ and $P_{k+1}$. The vectors are normalized, the dot product is obtained, and the arccosine is calculated so as to provide an angle between the two vectors, as illustrated by the angle Φ on the right hand side of FIG. 20. If the three points are collinear, the in-plane angle will thus be reported as 0. If the three points are close to collinear, the in-plane angle is small. If the three points define a sharp peak, the in-plane angle is large.

The torsion at point $P_k$ is represented by the angle between the plane of the current osculating circle, whose surface normal is the normalized cross product of the vectors T1 and T2, and the surface normal of the subsequent osculating plane defined by points $P_k$, $P_{k+1}$, and $P_{k+2}$. Just as the Fernet normal and binormal axes reverse direction as the Frenet frame crosses an inflection point, the normals of two successive osculating planes will point in opposite directions when $P_k$ and $P_{k+1}$ lie on opposite sides of an inflection point.

Although it may ultimately be desirable to retain the feature of torsional angles of 180° when points lie on opposite sides of an inflection point, this measure may be confusing to include when analyzing a plane or curve. Thus, for the analyses described herein, a torsional angle of zero, rather than 180°, will be assigned whenever the frame crosses an inflection point.

As stated above, both the in-plane and the torsional angles are positive angles lying between 0 and 180 degrees. A positive total angle of curvature at point $P_k$ can be calculated by taking the square root of the sum of the squares of the in-plane angle and of the torsional angle. The total angles can be summed for each valid point in the curve, and the result can be normalized by dividing by the total curve length. Results can be provided in radians per centimeter.

The following equations illustrate how the SOAM may be calculated. For any point $P_k$ along a curve, the vectors T1, T2, and T3 can be defined by the following equations:

$$T1 = P_k - P_{k-1}$$

$$T2 = P_{k+1} - P_k$$

$$T3 = P_{k+2} - P_{k+1}$$

The in-plane angle at point $P_k$ ($IP_k$) and the torsional angle $TP_k$ are given by the following equations, where $TP_k$, $IP_k$ are elements of $[0, \pi]$:

$$IP_k = \cos^{-1}((T1/|T1|) \cdot (T2/|T2|))$$

$$TP_k = \cos^{-1}((T1 \times T2/|T1 \times T2|) \cdot (T2 \times T3/|T2 \times T3|))$$

The total angle $CP_k$ at point $P_k$ is then $CP_k = \sqrt{(IPk \times IPk) + (TPk \times TPk)}$. The sum of angles metric calculates the total tortuosity of the curve as:

$$SOAM = \left(\sum_{k=1}^{n-3} CP_k\right) / \left(\sum_{k=1}^{n-1} |P_k - P_{k-1}|\right)$$

d. Tortuosity Calculations in Phantom Data

The differences between the three tortuosity metrics are most clearly explained using synthetic data. Table 6 provides the results of analysis of simple curves in which one variable is manipulated at a time. In Table 6, each trio of rows manipulates one variable and orders the curves from least to most tortuous. In Table 6, frequency represents a count of when a curve completes a full wavelength in the traditional sense or when a coil completes a full turn within axis is of unit length. Amplitude indicates both the amplitude of sinusoidal curves and the radius of a coil. For a given total length, it can be assumed that a higher frequency curve (more inflection points or a more tightly wound coil) should be assigned a higher tortuosity value. It can be assumed that for a given frequency, a curve of greater amplitude should be assigned a higher tortuosity value.

TABLE 6

Tortuosity Measurements Using Synthetic Data

| | Freq | Amp | Len | DM | ICM | SOAM |
|---|---|---|---|---|---|---|
| Sine | 3 | 10.0 | 13.9 | 1.6 | 9.7 | 0.9 |
| Sine | 10 | 3.0 | 13.9 | 1.6 | 32.3 | 3.1 |
| Sine | 20 | 1.5 | 13.9 | 1.6 | 64.7 | 6.2 |
| Coil | 3 | 6.3 | 13.9 | 1.5 | 1.5 | 1.3 |
| Coil | 10 | 1.9 | 13.9 | 1.5 | 1.5 | 4.5 |
| Coil | 20 | 0.94 | 13.9 | 1.5 | 1.5 | 9.2 |
| Sine | 3 | 10.0 | 13.9 | 1.6 | 9.7 | 0.9 |
| Sine | 3 | 20.0 | 22.9 | 2.7 | 16.0 | 0.7 |
| Sine | 3 | 40.0 | 42.6 | 5.0 | 29.7 | 0.4 |
| Coil | 3 | 6.3 | 13.9 | 1.5 | 1.5 | 1.3 |
| Coil | 3 | 20.0 | 33.7 | 3.6 | 3.6 | 0.6 |
| Coil | 3 | 40.0 | 65.3 | 6.9 | 6.9 | 0.3 |

The first three rows of Table 6 provide results for low, medium, and high frequency sine waves, each of which begins in the same start voxel and ends in the same end voxel. Via adjustment of amplitude, each sine wave also has the same total path length. The sine wave of highest frequency is therefore the most "wiggly," although it also has the lowest amplitude. The DM is incapable of distinguishing between such curves, and reports an identical tortuosity value for each. Both the ICM and the SOAM metric, however, correctly assign a higher tortuosity to curves of higher frequency.

The second three rows of Table 6 provide results for low, medium, and high frequency coils, each of which begins in the same start voxel and ends in the same end voxel. Via adjustment of amplitude, each coil has the same total path length. The coil of highest frequency therefore is the most "wiggly," although it also has the lowest amplitude. Similar to the sine wave example above, the DM is incapable of distinguishing between the three curves and assigns the same tortuosity value to each. As coils do not have inflection points, the ICM is also not capable of distinguishing between curves and reports results identical to that of the DM. Only the SOAM is capable of correctly distinguishing between the three curves, correctly assigning the highest tortuosity to the tightest coil of a given total path length.

The next three rows of Table 6 provide results for three sine waves, each of frequency 3, each of which begins and ends in the same begin/end voxels, but each of which is of different amplitude. The total path length thus increases from the first example to the last. Given a sine wave of given frequency, the curve of highest amplitude may be viewed as the most tortuous. The SOAM performs poorly in this case, since higher amplitude curves have lower average curvature. However, both the DM and the ICM order the curve tortuosities correctly.

The final three rows in Table 6 analyze coils of a given frequency but of variable amplitude. Similar to the results for sine waves, both the DM and the ICM perform well, but the SOAM is ineffective because broad curves exhibit low average curvature.

In summary, results in these test data suggest that no single one of the tortuosity metrics under evaluation is capable of handling all situations correctly. The ICM provides, at minimum, equal information to the DM and moreover correctly ranks curves of equal lengths but of increasing frequency. The ICM therefore appears to be more powerful than the widely used DM. However, neither of these methods deals well with tight coils, and only the SOAM appears capable of doing so effectively.

e. Analysis of Multiple Vessels

Any individual vessel can be assigned a tortuosity value by the methods described above. Medical analyses must often deal with clusters of vessels, however. For the SOAM metric, it is straightforward to combine results for a cluster of vessels by summing the sum of angles calculated for each vessel and then dividing this composite sum by the total path length of all vessels. This provides an average angle per unit distance for that vessel cluster.

It is less apparent how to combine the results of the ICM and DM, however, as these two metrics involve a ratio of path lengths. Averaging the values given by a vessel cluster has the undesirable effect of weighting a very short vessel equally with a long one. In one exemplary implementation, the values for the DM may be combined by summing the numerators reported by the DM for each vessel and then dividing by the sum of the denominators. The same approach may be used with the ICM. This approach provides a weighted average, with longer and more tortuous curves assigned a higher weight. Each metric thus reports a single value for each vessel cluster in each patient.

f. Results

Results of analysis of medical images are presented by tortuosity type. Each section contains a table and a brief commentary. Each abnormal case is compared to a group of eleven normal subjects. Within each table, one, two, or three stars mark an abnormal value that is more than one, two, or three normal standard deviations from the normal mean. Results are presented for individual vessels in Table 7 and for groups of vessels in Tables 8 and 9.

Table 7 provides results for a basilar artery exhibiting severe type I tortuosity. The abnormal artery and several normal examples are shown in FIG. 14. Type I tortuosity abnormalities are characterized by meandering, broad curves. The curvature at any particular point is likely to be low, but the total length of the path may be great as compared to a straight line. As expected, both the DM and the ICM do well in detecting this type of abnormality while the SOAM does poorly. From Table 7, ICM and the DM provide an effective means of detecting type I tortuosity abnormalities.

i. Type I Tortuosity

TABLE 7

Type 1 tortuosity of the basilar artery

|  | DM | ICM | SOAM |
|---|---|---|---|
| Abnormal Basilar | 1.5*** | 2.9*** | 4.0 |
| Normal Basilars | 1.1 ± 0.1 | 1.3 ± 0.5 | 4.7 ± 1.9 | ii. Type II Tortuosity

An example of type II tortuosity abnormality is shown in FIG. 15A-15C. A dense nest of curved and erratically twisting vessels of variable length characterizes this type of pathology. Table 8 provides results of the analyses of three AVM patients. Results are compared to the vessels lying in the same anatomical region of 11 normal subjects.

TABLE 8

Type II Tortuosity Abnormalities
(AVM = Arteriovenous Malformation)

|  | DM | ICM | SOAM |
|---|---|---|---|
| Large AVM | 1.6 | 325.1*** | 19.7 |
| Normal | 1.7 ± 0.6 | 39.2 ± 22.2 | 17.4 ± 1.9 |
| Medium AVM | 1.6*** | 75.8*** | 19.4 |
| Normal | 1.2 ± 0.1 | 12.8 ± 4.9 | 16.7 ± 3.4 |
| Small AVM | 1.5 | 50.1*** | 17.9 |
| Normal | 1.4 ± 0.2 | 24.0 ± 6.7 | 17.3 ± 2.3 |

As shown by Table 8, the distance metric often performs poorly with this type of pathology since many vessels are short. Indeed, the DM was able to flag only one of the three cases. The SOAM also has difficulty detecting type II abnormalities because the mix of broad and tight curves leads to an average curvature that is not very different from that of normal patients. The ICM, however, takes advantage of inflection counting to recognize the frequent changes of direction made by the "can of worms" that characterizes type II pathology. All results in patients with pathology were many standard deviations away from normal. It can be concluded that the ICM appears to be the method of choice when evaluating this type of lesion.

iii. Type III Tortuosity

FIGS. 16A-16C provide an example of type III tortuosity. The affected vessels form high frequency coils of low amplitude. These patients also possess abnormal, serpiginous vessels that wiggle their way within the enhancing tumor rim. Table 9 provides results for the three tumor patients imaged at high resolution. Results in each patient are compared to the vessels lying in the same anatomical region of 11 normal subjects.

As discussed above, the detection of tightly wound coils is very difficult for both the DM and the ICM, although the SOAM does better. Indeed, the SOAM was capable of differentiating abnormal from normal vessels in all three cases.

TABLE 9

Type III Tortuosity Abnormalities

|  | DM | ICM | SOAM |
| --- | --- | --- | --- |
| Tumor 1 | 1.2 | 20.3** | 21.5* |
| Normal | 1.2 ± 0.1 | 10.9 ± 4.0 | 16.3 ± 3.1 |
| Tumor 2 | 1.3 | 22.7*** | 21.6** |
| Normal | 1.2 ± 0.2 | 2.1 ± 1.1 | 12.5 ± 4.5 |
| Tumor 3 | 1.4 | 64.9* | 21.9* |
| Normal | 1.5 ± 0.2 | 45.6 ± 13.6 | 16.8 ± 3.0 |

Malignant tumors also possess small nests of vessels somewhat similar to that of AVMs, and larger, serpiginous vessels may course within the tumor boundary. Not surprisingly, the ICM is effective in flagging these types of abnormalities.

Defining the characteristics of tumor vessels as seen by MR is of particular interest because of the potential of non-invasively quantitating vascular response to anti-angiogenesis treatment. Although definite conclusions may require imaging of a higher number of subjects, from the results above, the SOAM appears to be the method of choice for characterizing the abnormal, tightly coiled vessels contained within all three of the patients with malignant tumors. The proportion of patients likely to possess additional longer, oscillating curves coursing around the surface of the tumor and best flagged by the ICM is unknown.

iv. Discussion

Quantitating abnormal tortuosity of the intracerebral vasculature is difficult not only because intracerebral vessels are inherently tortuous but also because there is no single, geometrical description of a "normal" intra-cerebral vessel. The problem is compounded because the variability of the human intracerebral circulation precludes one-to-one mapping of individual vessels between different subjects for more than a few major named vessels.

The methods described above quantitate the regional tortuosity of arbitrary portions of the 3D intracerebral vasculature. The results are encouraging. The distance metric (the tortuosity metric in most widespread use when analyzing 2D images) does not appear to be very useful for analyzing type III tortuosity. However, the new inflection count method appears effective in recognizing two of the three types of abnormal tortuosity. A metric that sums angulations appears to be the most effective in recognizing the third type of abnormality, characterized by high frequency, low amplitude coils. Several points should be made about the methods, however.

First, the methods described herein for measuring intracerebral vessel tortuosity require defining similar anatomical regions across patients whose heads may be of different sizes and shapes. If one maps the MRA of a patient with a long, thin head to the MRA of a patient with a round head using only rigid registration, vessels in one image may lie outside of the second patient's skull. This is obviously not an acceptable solution. If one uses either an affine or a fully deformable registration, however, one will deform the vessels of interest and thus alter tortuosity calculations. Although deformable mapping of all vasculature into a single patient's coordinate system might reduce normal variability and thus be desirable, such mapping might also have undesirable effects.

In the present implementation, the vessels were not transformed at all. Rather, the anatomical region of interest was deformed across patients. Vessels within this area of interest were then analyzed in their native states. Although this approach may ultimately be superseded by others, it seemed the safest approach under conditions in which registration of the vessels themselves would result in vessel deformation with a consequent unknown effect upon tortuosity calculations.

A second point is that the resolution at which the MRA data are obtained may affect tortuosity values. Type III tortuosity abnormalities, for example, may only be clearly evident on high-resolution images. It is therefore preferable to compare images of normal and abnormal subjects only when the images were obtained at the same resolution.

The particular vessel extraction protocol employed can also affect results. In particular, the exemplary extraction method described above defines each vessel skeleton as a spline and then regularly samples that spline at a fixed distance of the size of one voxel. Use of a fixed sampling distance may underestimate total path length and thus affect the values reported by the DM and ICM. However, as noted in Koenderink, *Solid Shape*, Cambridge Mass: MIT Press, pp. 167-194 (1993)), chords can be used to estimate arc length if they are short with respect to the radius of curvature. Indeed, if the chord is less than half the radius of curvature, deviation from the true arc length does not exceed one percent. For a vessel to have a radius of curvature of two voxels, that vessel must make a sharp turn and possess a radius of less than half a voxel to be discriminated from the voxelized image data at all. Such vessels will be very faint because of volume averaging. Current vessel extraction methods may be incapable defining vessels of a much lower radius of curvature. A sampling distance of one point per voxel thus will not affect the calculation of arc length significantly. However, a long distance between sample points would obviously impede accurate length estimation as well as cause other problems such as inaccurate inflection counting.

The exemplary approaches described herein utilize the vessel central axis to compute tortuosity. The effect of vessel radius upon curvature has not been explicitly addressed, although a vessel's radius clearly affects maximum allowable curvature. The mathematical relationship between curvature and radius is complex. (See Damon, J., "Determining the Geometry of the Boundaries of Objects from Medial Data," Available at: http://midag.cs.unc.edu/pubs/papers/Damon_SkelStr_III.pdf).

A final point is that vessel tortuosity is only one of several measures of vessel shape used by clinicians when recognizing and staging disease. Vessel diameter, branching patterns, and vascular density are also important. Determining such patterns in normal patients and in patients with disease could, in combination with tortuosity calculations, provide a new and very exciting means of quantitative image analysis helpful in diagnosing and evaluating a variety of diseases.

4. Use of Tortuosity and Other Measures in Detecting Malignancy in Brain Tumors a. Introduction

Blood vessels surround and permeate all organs of the human body. Almost every disease, from cancer to the common cold, affects the vasculature. In this section, the term "vascular attributes" refers to the combination of "vessel morphology," "vessel density," and "vessel branching pattern." An automated, quantitative calculation of vessel attributes as seen by high resolution, magnetic resonance (MR) images could provide a new and powerful method of diagnosing and staging many diseases.

Malignancy poses a particularly interesting problem. Malignant tumors secrete factor that induce growth of new, abnormally tortuous vessels within the tumor bed. Indeed, in the brain, abnormal vessels provide the most prognostically ominous sign by histological analysis (Burger P. C., Scheithauer B. W., Vogel F. S., "Surgical Pathology of the Nervous System and its Coverings," Third Edition, Churchil Livingstone, N.Y. (1991)), and successful tumor treatment reduces local increases in both vessel number and tortuosity as seen by histological section (Jain R. K., "Normalizing Tumor Vasculature with Anti-Angiogenic Therapy: A New Paradigm for Combination Therapy," Nature Medicine 7, pp. 987-98 (2001)).

The ability to identify and quantitate morphological abnormalities of vessels within MR tumor images would be of high clinical value. Intrinsic brain tumors are graded in terms of increasing malignancy on a scale of I-IV, with treatment dependent upon grade as determined by biopsy. However, each tumor may contain regions of differing malignancy. Moreover, highly malignant tumors, or tumors treated by radiation therapy or other means, may contain necrotic regions in which no tumor cells are present. Sampling error during biopsy thus often underestimates tumor grade, with estimates of false diagnosis in the range of 35%-50% (Kaufman H. H., Ostrow P. T., Butler I. J., "Diagnostic Brain Biopsy. In: Wilkins R H, Rengachery S S (eds.) Neurosurgery, McGraw-Hill, New York, pp. 289-294 (1985)).

Current imaging attempts to define tumor grade and local regions of malignancy include MR spectroscopy, MR perfusion, and PET scanning. However, none of these methods are yet fully reliable (Kahn D., Follett K. A., Bushnell D. L., et al., "Diagnosis of Recurrent Brain Tumor: Value of $^{201}$T1 SPECT vs $^{18}$F-fluorodeoxyglucose PET," *AJR Am J Roentgenol.*, 163: pp. 1459-1465 (1994); Yoshii Y., Moritake T., Suzuki K., et al., "Cerebral Radiation Necrosis with Accumulation of Thallium 201 on Single-Photon Emission CT," *AJNR Am J Neuroradiol.*, 17: pp. 1773-1776 (1996); Ricci P., "Differentiating Recurrent Tumor from Radiation Necrosis with 18FDG-PET: Time for Reevaluation?," In: *Proceedings of the 34th Annual Meeting of the American Society of Neuroradiology*. Seattle, Wash.; (1996); and Benard F., Romsa J., Hustinx R., "Imaging Gliomas with Positron Emission Tomography and Single-Photon Emission Computed Tomography," Seminars Nuc. Med. 23, pp. 148-162 (2003)). Disruption of the blood-brain barrier may be one of the confounding factors for perfusion imaging. Vessels are usually not present within necrotic areas, however, and the direct identification of abnormal vessel clusters should be capable of flagging regions of active tumor growth and of high malignancy. Moreover, the ability to measure vessel morphology quantitatively has the exciting potential of defining "vessels of malignancy" and thus of providing a non-invasive means of determining tumor grade. Although this report focuses upon the brain, the same approach is potentially extensible to lesions in any anatomical location, such as the breast or lung.

This section provides a first exploration of vessel attributes over the population of vessels and vessel segments contained within the margins of known malignant tumors as imaged by MR. For five patients with known high grade gliomas, vessel attributes are compared to those of fourteen normal subjects. For this training set, in which the diagnosis of malignancy was known in advance, it can be concluded that both tortuosity evaluation and a count of terminal braches appear to be effective when differentiating tumor vessels from those of normal subjects within the same region of interest.

b. Background

The concept of providing an automated, quantitative means of measuring vessel attributes is not new. Several groups have proposed analysis of 2D vascular images to predict the likelihood of progressive atherosclerosis or aneurysm formation (Smedby O., Hogman N., Nilsson S., Erikson U., Olsson A. G., Walidius G., "Two-Dimensional Tortuosity of the Superficial Femoral Artery in Early Atherosclerosis," J. Vascular Research, 30 pp. 181-191 (1993)) or to evaluate retinopathy of prematurity (Bracher D., "Changes in Peripapillary Tortuosity of the Central Retinal Arteries in Newborns," Graefe's Arch Clin Exp Opthalmol, 218 pp. 211-217 (1982); Zhou L. A., Rzeszotarski M. S., Singerman L. J., Chokreff J. M., "The Detection and Quantification of Retinopathy Using Digital Angiograms," IEEE-TMI, 13 pp. 619-626 (1994); Goldbaum M. H., Hart W. E., Cote B. L., Raphaelian P. V., "Automated Measures of Retinal Blood Vessel Tortuosity," Invest Opthalmol Vis Sci, 35 p. 2089 (1994); Hart W. E., Goldbaum M., Cote B., Kube P., Nelson M. R., "Measurement and Classification of Retinal Vascular Tortuosity," Intl J Medical Informatics, 53(2-3) pp. 239-252 (1999); and Capowski J. J., Kylstra J. A., Freedman S. F., "A Numeric Index Based on Spatial Frequency for the Tortuosity of Retinal Vessels and its Application to Plus Disease in Retinopathy of Prematurity," Retina, 15 pp. 490-500 (1995)). Other groups are working in 3D on the specific problems of carotid stenosis (Frangi A. F., Niessen W. J., Hoogeveen R. M., Walsum T. V., Viergever M. A., "Quantification of Vessel Morphology from 3D MRA," *MICCAI '99 Lecture Notes in Computer Science*, 1679 pp. 358-367 (1999)) or aortic aneurysms (De Bruijne M., van Ginneken B., Niessen W. J., Maintz, JBA, Viergever, "Active Shape Model Based Segmentation of Abdominal Aortic Aneurysms in CTA Images," SPIE, 4684: pp. 463-474 (2002)). However, what is needed for wide scale utility is analysis of multiple vessel attributes over vessel populations, in 3D, and with the inclusion of small vessels.

As described above, tortuosity is one metric that may be used to characterize vasculature systems. Tortuosity has been defined in three types, type I, type II, and type III, which can be used to characterize different types of vessel curvature. In addition, exemplary tortuosity metrics that may be useful in comparing tortuosity among patients include the DM, the ICM, and the SOAM.

In this section, tortuosity, vessel density, vessel radius, and number of terminal branches (vessels that begin and end within the tumor volume) are evaluated. Given a region of interest demarcated by tumor boundaries, the goal is to seek a set of vascular attributes that distinguish the vasculature associated with malignant gliomas from those of normal patients in the same anatomical region. The selection of attributes was based upon what pathologists describe as the characteristics of vascular abnormalities in malignancy-growth of new clusters of abnormally tortuous vessels.

c. Methods

One exemplary approach for analyzing the brain vasculature includes segmentation of vessels from MRA and tumors from high-resolution MR anatomical images. Coordinate mapping between images is enabled by affine registration of all images with an atlas so that, via a combination of forward and backward transformations, the coordinates of any tumor can be mapped into the undeformed space of any patient's MRA. Results are reported for five tumors with comparison to the means and standard deviations of vessel attributes within the same anatomical region of fourteen normal subjects.

i. Image Acquisition and Segmentation

In the study described in this section, all patients were imaged by 3D, high-resolution, time-of-flight MRA using a quadrature head coil. Inplane resolution was 0.8×0.8 mm and interslice thickness was 1 mm. All subjects additionally underwent high-resolution T1 and T2 imaging, with tumor patients receiving gadolinium-enhanced T1 studies as well.

Vessel segmentation was done by the method of Aylward (Aylward S., Bullitt E., "Initialization, Noise, Singularities and Scale in Height Ridge Traversal for Tubular Object Centerline Extraction," IEEE-TMI 21, 6 pp. 1-75 (2002)). Vessel extraction involves 3 steps: definition of a seed point, automatic extraction of an image intensity ridge representing the vessel's central skeleton, and automatic determination of vessel radius at each skeleton point. The output of the program provides sets of directed, 4-dimensional points indicating the (x,y,z) spatial position of each sequential vessel skeleton point and an associated radius at each point. Extracted vessels were then postprocessed to produce connected vessel trees and to exclude noise (Bullitt E., Aylward S., Smith K., Mukherji S., Jiroutek M., Muller K., "Symbolic Description of Intracerebral Vessels Segmented from MRA and Evaluation by Comparison with X-Ray Angiograms," Medical Image Analysis 5 pp. 157-169 (2001)).

Tumor segmentation was provided by Gerig. Segmentation in two cases was performed by a new, automated method that uses multi-channel input and an atlas-based approach with five tissue classifiers: grey matter, white matter, CSF, edema, and tumor tissue (Prastawa M., Bullitt E., Gerig G., "Robust Estimation for Brain Tumor Segmentation," Accepted MICCAI (2003)). Three tumor cases were segmented using a partially manual program that segments tumors via polygon drawing and filling on orthogonal cuts through an image volume. The interactive program is available at http://www.cs.unc.edu/~gerig/. The output of both programs is a mask file in which each voxel associated with object 1 is labeled "1" and voxels unassociated with a segmented object are labeled "0."

ii. Image Registration

The human vasculature is variable. It is thus impossible to provide a one-to-one vascular mapping between patients for more than a few named vessels. Moreover, vessel attributes may vary from location to location. Evaluation of disease thus requires knowledge of the mean and variance of normal vessel attributes within a region of interest. Such mapping across patients requires image registration.

For this study, the vessels themselves were not transformed as such transformation might itself alter vessel attributes, but rather to deform the region of interest across patients. Vessels within an area of interest were thus analyzed in their native states. All registrations were performed using Rueckert and Schnabel's mutual information-based registration program (Schnabel J. A., Rueckert D., Quist M., Blackall J. M., Castellano Smith A. D., Hartkens T., Penney G. P., Hall W. A., Liu H., Truwit C. L., Gerritsen F. A., Hill D. L. G., and Hawkes J. D., "A Generic Framework for Non-Rigid Registration Based on Non-Uniform Multi-Level Free-Form Deformations," MICCAI 2001; Lecture Notes in Computer Science 2208 pp 573-581 (2001); Rueckert D., Sonoda L. I., Hayes C., Hill D. L. G., Leach M. O., and Hawkes D. J., Non-Rigid Registration Using Free-Form Deformations: Application to Breast MR Images," IEEE Transactions on Medical Imaging, 18, pp. 712-721 (1999); and Rueckert D., "Rview," (2002) Available at: www.doc.ic.ac.uk/~dr/software). This program permits rigid, affine, and fully deformable registration. For rigid and affine registrations, the output can be saved as a file convertible to a registration matrix. Settings for rigid and affine registrations included bins=64, iterations=100, steps=4, step length=2.0, levels=3, and similarity measure=normalized mutual information. For this experiment, only rigid and full affine registrations were used, and the output matrices were saved.

The T1 image of each patient was registered using a full affine registration to the McConnell T1 brain atlas. The additional images of each patient were then rigidly registered to that same patient's T1 image. Lesion coordinates from any tumor patient could then be transformed into the coordinate system of any other patient's MRA via a set of matrix multiplications, with matrix inversion when appropriate. Vessels traversing the region of interest were clipped and analysis was applied only to those vessels and vessel segments lying within the region of interest. This approach therefore calculates vessel attributes only within the undeformed space of each target MRA.

iii. Vessel Attributes

Each tumor patient was compared to fourteen normals. Attributes examined included:

1) Tortuosity as evaluated by both the SOAM and the ICM. Tumor vessels are known to be abnormally tortuous by histological analysis.
2) The ratio of vessel volume to tumor volume. Ingrowth of new vessels might increase the proportion of the volume of interest occupied by vessels.
3) The average radius of the vessels or vessel segments within the region of interest. New vessel growth might produce feeding vessels of larger diameter.
4) Count of terminal branches (branches that begin and end within the volume). As tumors induce vessel ingrowth, an additional number of vessels might be expected.

In some cases, one or more normal patients had no vessels in the anatomical region corresponding to the tumor. In these cases the vessel volume and the number of terminal branches were set to 0 and used the full number of normal patients were used in the analysis. However, there is no good way to provide a tortuosity value or an average radius if no vessels are present. Therefore, these parameters were evaluated using only the subset of normal subjects that possessed vessels within the anatomical region of interest.

For each variable, results were averaged to provide a single value for all vessels in a given patient. "Radius," for example, represents the average radius of all vessel points within the volume of interest for a given patient.

Malignant gliomas may encase normal vessels as well as induce growth of new vessels. Whether encased vessels themselves become abnormal is unknown. For this initial analysis, the vessels of tumor patients were not subdivided into different groups. Results reported for tumor patients are therefore likely to incorporate values produced by encased "normal" vessels as well as results produced by new vascular growth induced by the tumor.

d. Results

Figure 21:
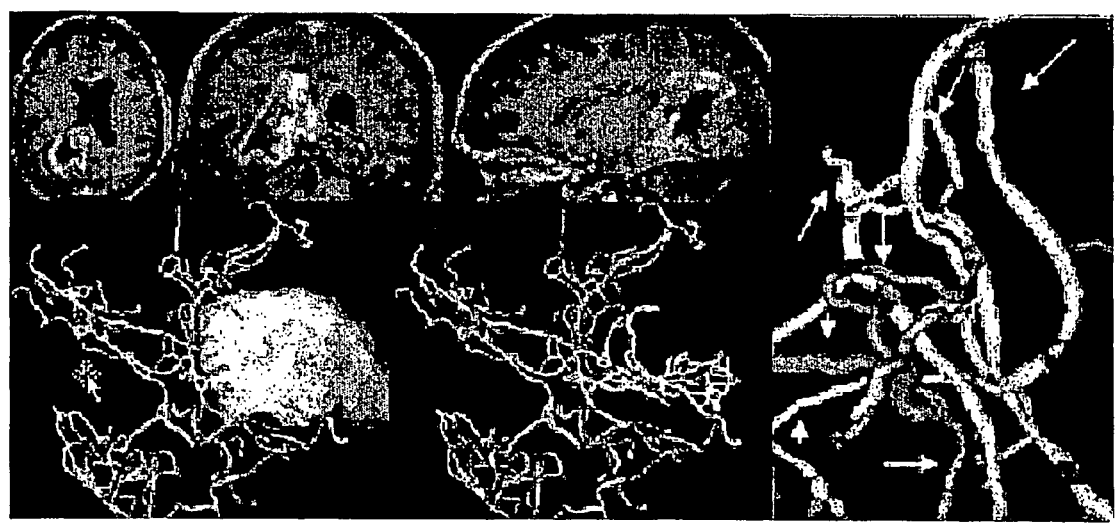
FIG. 21 includes images of a patient with a malignant glioma and associated extracted vasculature.

FIG. 21 illustrates a patient with a malignant glioma. The upper row in FIG. 21 includes gadnolinium-enhanced MR slices. In the bottom left, the tumor is volume rendered at full capacity and shown with surface rendered, segmented vessels. In the bottom center of FIG. 21, the tumor is set to zero opacity in order to display the vasculature inside of the tumor. The image on the far right in FIG. 21 illustrates foci of abnormal tortuosity type III (arrows) involving vessels contained within (medium gray) and passing through (light gray) the tumor. Dark gray vessels represent vessels outside of the tumor.

In FIG. 21, it can be seen that both traversing and intrinsic tumor vessels have high frequency, low amplitude "wiggles"

rarely find outside of a tumor or in normal patients. This abnormality is referred to herein as tortuosity type III. The medium gray vessels also produce a "can of worms" configuration and provide an example of tortuosity type II. The medium gray vessels additionally represent an abnormal vessel cluster unlikely to be present within the same anatomical region of normal patients. Table 10 shown below illustrates exemplary results of comparing vessel attribute measurements for five tumor patients with measurements for the fourteen patients determined to have a normal vasculature in the region of interest.

TABLE 10

Vessel Attribute Measurement Comparisons between Tumor Patients and Atlas of Patients with Normal Brain Vasculatures

|  | Tumor 1 | Tumor 2 | Tumor 3 | Tumor 4 | Tumor 5 |
| --- | --- | --- | --- | --- | --- |
| In-Plane Sum-of-Angles | 4.7** | 4.4* | 7.5** | 4.5*** | 6.4*** |
|  | 2.8 ± 0.8 | 3.5 ± 0.7 | 3.9 ± 2.1 | 3.1 ± 0.4 | 2.6 ± 0.5 |
| Inflection Count | 20.2*** | 22.2* | 23.9*** | 71.7* | 62.9*** |
|  | 4.3 ± 2.6 | 12.9 ± 6.0 | 2.3 ± 1.1 | 47.2 ± 15.9 | 27.3 ± 7.7 |
| Proportion of the Region of Interest Occupied by Vessels | 0.68*** | 0.09** | 0.09*** | 0.05 | 0.07 |
|  | 0.05 ± 0.01 | 0.04 ± 0.02 | 0.01 ± 0.001 | 0.05 ± 0.01 | 0.07 ± 0.02 |
| Average Radius of Vessels with Region | 0.11* | 0.09* | 0.05* | 0.05* | 0.08 |
|  | 0.08 ± 0.02 | 0.07 ± 0.01 | 0.07 ± 0.01 | 0.07 ± 0.01 | 0.07 ± 0.01 |
| Count of Branches Fully Contained with Region of Interest | 5*** | 7*** | 13*** | 16*** | 24*** |
|  | 0.1 ± 0.5 | 0.9 ± 1.2 | 0.1 ± 0.3 | 5.9 ± 3.2 | 9.1 ± 2.5 |

In Table 10, results for each tumor are given in a column, with mean and standard deviation of normal immediately below each value. One star indicates a tumor value more than one standard deviation from normal and three stars indicates a tumor value more than three standard deviations from normal.

As shown by Table 10, some of the variables appear helpful whereas others do not. The first two rows of Table 10 indicate tortuosity evaluation by two metrics. All five tumors exhibited significant increases in tortuosity by both metrics. The volume ratio was less helpful, however. Although three tumors displayed an increase in proportion of volume occupied by vessels, two did not. The average vessel radius calculation was also not helpful, with some tumors exhibiting a higher average vessel radius and some a lower. On the other hand, the count of terminal branches was markedly different between tumor and normal patients, and all five tumor cases displayed an increased number of terminal branches well more than three standard deviations from normal.

Thus, from the data above, quantifiable differences exist between the vascular of normal subjects and malignant glioma patients. Both tortuosity and terminal branch count appear to be useful in discriminating between patients with malignant gliomas and patients with normal cerebral vasculatures. For example, as illustrated in Table 10 above, a terminal branch count of three or more standard deviations from the normal may indicate a malignant glioma. Similarly, tortuosity, as measured by enplane sum of angles or inflection count, indicating a variance of more than three standard deviations from average may also indicate malignant glioma.

Even though the results above conclude several metrics for predicting malignant gliomas, the methods can be improved in the following manners. First, there are many ways in which one vessel population can be compared to another. This study made a set of assumptions based on qualitative diagnostic criteria used to define malignant gliomas by histological examination. Several criteria expected to show significant differences between groups were successful, but others were not. In retrospect, some of the questions might have been better posed. The analysis of vessel density, for example, calculated a ratio of total vessel volume to the total tumor volume. In fact, as shown in FIG. 21, almost all malignant gliomas exhibit both foci of high vascularity and foci of a vascularity. A better approach might seek for localized regions of vascular clustering an abnormality and then flag and count these voxels. Such an approach would provide a better comparative analysis and could tell the surgeon on a voxel-by-voxel basis which reasons of the tumor appear best for biopsy.

Second, the optimal method of registration is unknown when analyzing vasculature. The method described in this study did not deform the vessels themselves, but rather used an affine registration to deform the region of interest across patients. This may or may not prove to be the optimal solution.

Third, the vessels of interest are small. High resolution MR (e.g., at least 1×1×1 mm) is preferable. A method of vessel extraction capable of defining small vessels is also preferable.

Finally, the aim of this study is to define parameters likely to be important in characterizing the vasculature of malignant tumors. Confirmation of the conclusions may require a larger normal database in testing against a large set of patients baring tumors of different grades. Moreover, even if the results are confirmed, it is not known what vascular patterns of metastatic tumors or of lower grade gliomas might be. It is also not know if there is a single pattern that characterizes vessels of malignancy, if a single patter shows progressive deviation from normal with increasing malignancy or, if multiple tumor-specific patterns exist.

In summary, the data above in Table 10 indicates that certain blood vessel attributes can be used to characterize malignant tumors as seen by medical imaging data. Such an ability has great clinical potential. The initial results suggest that a minimum that malignant tumor vessels can be differentiated from those of normal patients within a similar anatomical region on the basis of both tortuosity and count of terminal branches.

G. Applications

1. Generally

The methods, systems, and computer program products disclosed herein can be applied to the identification of tumors, vasculopathies, vasculitides, degenerative diseases, vasospasm, arteriovenous malformations and aneurysms, psychiatric diseases, congenital diseases, and infectious diseases, diseases affecting blood coagulation.

Tumor applications of the methods, systems, and computer program products described herein can include: non-invasive determination of malignancy; distinction regions of necrosis from growth; definition of tumor type; screening test for malignancy; quantitatively measure response to therapy with imaging over time; tumor sub-classification for prognosis; and non-invasive monitoring of tumor progression.

Vasculopathies and vasculitides applications of the methods, systems, and computer program products described herein can include determination of risk of stroke or end-organ infarction; non-invasive, quantitative monitoring of therapy; non-invasive, quantitative monitoring of disease progression; screening test for disease; and prediction of which kind of treatment may best suit a particular vascular pattern.

Degenerative diseases can include Alzheimer's disease, Pick's disease, Parkinson's disease, micro-infarct dementia, hydrocephalus, multiple sclerosis, encephalopathies, Hallervorden-Spatz, and idiopathic dementias. Degenerative disease applications of the methods, systems, and computer program products described herein can include determination prognosis and non-invasive, quantitative monitoring of treatment or progression of any of these diseases.

Vasospasm, arteriovenous malformation, and aneurysm applications of the methods, systems, and computer program products described herein can include determination of risk of stroke or end-organ infarction; non-invasive, quantitative monitoring of therapy; non-invasive, quantitative monitoring of disease progression; screening test for disease; and determination of risk of hemorrhage.

Psychiatric diseases can include depression, schizophrenia, bipolar disorder, anxiety, sleep disorders, eating disorders, and drug dependence. Psychiatric disease applications of the subject matter described herein can include determination prognosis and non-invasive, quantitative monitoring of treatment or progression.

Congenital diseases can include lenticulostriate vasculopathy, infection, cardiac defects, mineralizing vasculopathy, neurofibromatosis, vascular malformations, Ehlers-Danlos and other collagen disorders, Marfan's syndrome, fibromuscular dysplasia, sickle cell anemia, and idiopathic vasculitis. Congenital disease applications of the subject matter described herein can include determination of risk of stroke or hemorrhage; non-invasive, quantitative monitoring of therapy; non-invasive, quantitative monitoring of disease progression; screening test for disease; and estimate of prognosis.

Infectious diseases can include HIV, viruses (such as cytomegalovirus varicella-zoster, rubella, and mononucleiosis), and parasitic diseases (such as toxoplasmosis, tuberculosis, fungal, and bacterial). Infectious disease applications of the subject matter described herein can include: determination of risk of stroke or end-organ infarction; non-invasive, quantitative monitoring of therapy; non-invasive, quantitative monitoring of disease progression; and non-invasive distinction between abscesses or other infectious manifestations and tumors.

Diseases affecting blood coagulation can include sickle cell anemia, coagulopathy of pregnancy, disseminated intravascular coagulation and other consumptive coagulopathies, and drug-induced coagulopathy. Blood disease applications of the subject matter described herein can include: determination of risk of stroke or end-organ infarction or hemorrhage; non-invasive, quantitative monitoring of therapy; and non-invasive, quantitative monitoring of disease progression.

In addition, the methods, systems, and computer program products disclosed herein can be applied for analyzing the risks/advantages of endovascular or surgical intervention; possible non-invasive determination of disease type that will affect treatment prognosis; and advance determination of optimal form given a diagnosis. Endovascular or surgical intervention applications can include: preoperative tortuosity measures; quantitative analysis of aneurysm and aneurysm neck configurations for suitability of coiling; and prediction of relative likelihood of hemorrhage with AVM endovascular, surgical, or radiotherapy treatment.

2. Application to Spatial Localization of Task-Induced Neural Activity a. Introduction The methods, systems, and computer program products described herein can be applied for the localization of functional activation sites for estimating neurological similarities and differences. Spatial localization of task-induced neural activity can be important for quantifying general stereotaxic properties used in neurological investigations and neurosurgical interventions. Significant work has been directed toward categorizing general functional regions and providing methods for cross-subject comparisons or atlas correlation. (See Cramer S., Benson R., Vijaya B., Himes D., Crafton K., Janowsky J., Brown J., Lutsep H., "Mapping Individual Brains to Guide Restorative Therapy after Stroke: Rationale and Pilot Studies," Neurological Research, 25: pp. 811-814 (December 2003); Amunts K., Zilles K., "Advances in Cytoarchitectonic Mapping of the Human Cerebral Cortex," Neuroimaging Clinics of North America, 11(2): pp. 151-169 (May 2001); and Thees S., Blankenburg F., Taskin B., Curio C., Villringer A., "Dipole Source Localization and fMRI of Simultaneously Recorded Data applied to Somatosensory Categorization," NeuroImage, 18: pp. 707-719 (2003).)

Stereotaxic atlases, such as the common Talairach-Tournoux (Talairach, J., Toumoux, P., Co-planar Stereotaxic Atlas of the Human Brain. Georg Thieme Verlag, Stuttgart. (1988)), provide detailed information on the human brain structure and functional anatomy. The advent and expanded use of functional Magnetic Resonance Imaging (fMRI) both clinically and in research over the past 15 years has allowed for advanced in vivo studies of functional brain activity. The correlation of fMRI neural activations across a sampled population augment current exemplar-based stereotaxic atlases with statistical information on expected variations, thereby providing a more accurate tool for neurological assessment and planning. Unfortunately, most current neuronal alignment techniques utilize registration based on cortical tissue properties and the results often lack congruent localization of the functional sites. (See Swallow K., Braver T., Snyder A., Speer N., Zacks J., "Reliability of Functional Localization using fMRI," NeuroImage, 20: pp. 1561-1577 (2003).) The limitation of these registration techniques to provide sound coherence of homologous activations compromises its use a statistical prior. This section proposes the incorporation of cerebral blood vessel properties for inter-subject registration as a more effective medium set for functional site alignment than traditional cortical tissue.

A hypothesized link between functional site locality and the underlying vascular network is built on biological principles. The human circulatory system not only plays an essential role in the maintenance of biological homeostasis, but has also been shown to influence surrounding tissue development during embryological growth amid tissue repair. Vascular endothelial growth factor (VECF) plays a key role in organogenesis by directing blood vessel formation and driving surrounding tissue differentiation within the liver, pancreas and kidney. (See Kitamoto Y., Tokunaga H., Tomita K., "Vascular Endothelial Growth Factor is an Essential Molecule for Mouse Kidney Development: Glomerulogenesis and Nephrogenesis," Journal of Clinical Investigation, 99: pp. 2351-57 (1997); Lammert E., Cleaver 0., Melton D., "Induction of Pancreatic Differentiation by Signals from Blood Vessels," Science, Volume 294: p. 564 (October 2001); and Matsumoto K., Yoshitomi H., Rossant J., Zaret K., "Liver Organogenesis Promoted by Endothelial Cells Prior to Vascular Function," Science, Volume 294: p. 559 (October 2001); and Seydel C. "Organs Await Blood Vessels' Go Signal," Science, 291: p. 2365 (2001)), and it is believed to be involved in the development of other organs. Biochemical studies have further linked VEGF to neuropilin-1, a protein receptor that binds the collapsin/semaphorin molecules necessary for neuron connectivity guidance. Based on the biological conclusions, neurological development in humans, particularly higher-order functions such as memory and language, might be affected by vascular growth factors, like VECF, which would link neuron functions with vascular proximity. Assuming substantial correlation between neuron functional sites and vascular locality, it follows that cross-subject alignment based on vasculature should enhance the correspondence of functional sites.

This section compares techniques for functional alignment based on tissue properties and vessel alignment to assess possible correlations between neuronal organization and vascular structure. A study was conducted with 10 male volunteers (8 right handed, mean age 24.5, range 20-37) without any history of neurological or psychiatric disease. Two task-based fMRI tests, one a primary motor test and the other a higher function memory test, were completed by each subject in addition to traditional anatomic and angiogram scans.

b. Methods

In this study, two task-based fMRI activation scans on a 3T Siemens scanner. The activation scans were collected using a T2-weighted blood oxygenation level dependent (BOLD) gradient echo planar imaging (EPI) sequence. Both tasks were conducted in independent scan series using identical scanning protocols. Alternation of active/inactive states occurred with 30 seconds of scanned stimulus followed by 30 seconds of baseline status. This cycle was repeated four times for a complete scan time of four minutes. A total of 80 isotropic volumes with spacing of 3 millimeters and size 64×64× 64 was collected with repetition time (TR) of 3 seconds and echo time (TE) of 50 milliseconds.

The first task highlighted bilateral sensorimotor strip activation through thumb-to-fingers touching on both hands. The symmetry of this simple motor activity may limit artifact effects of limited dexterity in one hand. The second task utilized higher mental function, by incorporating numerical addition test from visual prompts with memory recall. During the active period, a number was displayed for the full TR with no lag time in between successive scans. Subject response was required when the sum of numbers displayed on alternating scans totaled 10.

i. fMRI Processing

Offline fMRI processing was completed using statistical parametric mapping (SPM). Preprocessing of the time series involved intra-series brain realignment and Gaussian smoothing with a kernel size of 6×6×6 millimeters. The spatial normalization and corregistration were not incorporated into the preprocessing, to ensure no induced cross-subject correlation during functional image construction. T-contrast statistical parametric maps were formed independently for each subject's two sessions applying the hemodynamic response function for stimulus onset.

Figure 22A:
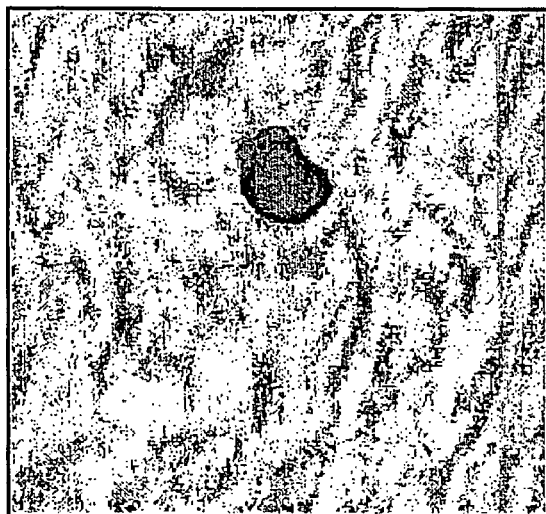
FIGS. 22A and 22B include images of an extracted prefrontal memory activation site from functional t-images and its overlay onto T1, respectively.
Figure 22B:

From the resulting t-images, functional activations were extracted where t>2 forming a three-dimensional blob object representative of the neural activation. FIGS. 22A and 22B are images of an extracted pre-frontal memory activation site from functional t-images and its overlay onto T1, respectively. A total of three functional sites were drawn from each subject's 2 task scans, one from each of the sensorimotor strips and one consistent memory activation site located in the prefrontal cortex.

ii. Registration of Functional Sites

In order to test the hypotheses described in this section, both anatomical and blood vessel registration techniques were employed to map the extracted functional groups into common coordinates. Both techniques mapped an affine transformation to the functional meshes allowing for comparison of spatial correspondence between homologous activations. The mutual-information metric (MI) as described in (Mattes D., Haynor D. R., Vesselle H., Lewellen T. K., Eubank W., "Nonrigid Multi-Modality Image Registration," In M. Sonka and K. M. Hanson, editors, Medical Imaging: Image Processing, volume 4322 of Proc. SPIE. SPIE Press, Bellingham, Wash., (2001) and Viola P., Wells III W., "Alignment by Maximization of Mutual Information" International Journal of Computer Vision, 24(2): pp. 137-154 (1997)), used for the tissue-based registration of subject's skull-stripped, t1-weighted images. MI is an effective multi-modal registration technique capable of identifying precise inter-subject image correspondences necessary for cortical alignment.

To achieve vascular registration, the tube-model-to-image metric, as described in Aylward S., Jomier J., Weeks S., Bullitt E., "Registration of Vascular Images," International Journal of Computer Vision, 55(3), pp. 123-138 (November 2003) was used to align extracted blood vessels to a smooth vessel image representation. The alignment technique used in this study replicated the method described above for vascular atlas formation, where cerebral arteries drawn from magnetic resonance angiograms are modeled into complete arterial tree structures. Each subject's vascular tree model was applied to an inverted Danielsson distance image representing a continuous three-dimensional vascular tree template. The optimizer can apply the model-to-image metric to maximize the correspondence of modeled blood vessels to peak intensity ridges within the template image, which represent vascular positions. In this study, the vascular tree of one subject was selected as the template exemplar.

Extraction of the arterial vascular models for vessel registration can be completed by using a tube centerline traversal technique combined with dynamic vessel radius estimation, as described in Aylward S., Bullitt E., Pizer S., Eberly D., "Intensity Ridge and Widths for Tubular Object Segmentation and Registration," IEEE Workshop on Mathematical Methods in Biomedical Image Analysis, pp. 131-138 (1996) and Aylward S., Bullitt E., "Initialization, Noise, Singularities, and Scale in Height-Ridge Traversal for Tubular Object Centerline Extraction," IEEE Transactions on Medical Imaging, 21(2), pp. 61-76 (2002). This process executes a multi-scale traversal of a blood vessel's centerline, initiated from a seed point found on or near a tube centerline. Identification of seed points for all visible arteries and arterial branches generates the blood vessel model are then used for vessel registration. After cross-subject registrations are achieved, the resulting affine transformations were applied to the extracted functional blobs to bring them all into common coordinates.

c. Results

Aligning each subject's functional activations using the anatomical and arterial properties formed three clusters corresponding to the three tested activation sites: pre-frontal memory activation (memory), and the Left and Right hemisphere sensorimotor strip (left and right motorstrip). Qualitative analysis of the functional clusters indicated a tighter overlap of activations coordinated through artery vessel registration as opposed to brain tissue.

FIGS. 23A and 23B are X-Y plots of the two-dimensional spatial locality of the three functional clusters for both the artery and the tissue aligned groups, respectively. Points on the plot represent the calculated center of mass for each functional activation object, and can be treated as the focal approximation to the center of neural activity. The functional centers appear more diffuse within the anatomically aligned clusters, which is particularly evident in the memory cluster.

Results of functional localization were verified quantitatively through comparison of the functional center variance within each cluster. Both sets of functional data were normalized based on the relative spread of the center of masses for their three functional clusters. The result of this normalization marginally increased the spread of functional centers on the blood vessel registered data in order to match the diffuse tissue-aligned clusters. In spite of this dispersion, the artery aligned clusters showed enhanced three-dimensional localization of the functional centers based on variance statistics along the major axes. Table 11 below shows the standard deviation dispersion of functional centers.

TABLE 11

Standard Deviation Dispersion of Functional Centers

| Functional Activation | Registration Type | $\sigma_x$ | $\sigma_y$ | $\sigma_z$ |
|---|---|---|---|---|
| Memory | Arterial | 2.56 | 10.37 | 3.96 |
| | Anatomical | 3.34 | 12.33 | 5.54 |
| Left Motorstrip | Arterial | 5.84 | 9.57 | 7.80 |
| | Anatomical | 7.87 | 8.96 | 10.97 |
| Right Motorstrip | Arterial | 4.93 | 8.67 | 7.63 |
| | Anatomical | 4.28 | 11.08 | 10.53 |

One-sided F-tests with alpha=0.05 or the $\sigma_z$ values demonstrated statistically significant measures to accept the alternative, $\sigma_{arteries_x} < \sigma_{anatomical_z}$, for all three activation clusters. Rejection of Null hypothesis can be permitted in all but the right sensorimotor strip. These indicate a tighter fit of functional sites resulting from alignment of cerebral arteries as compared to registration tissue properties. Measurement of the relative overlap of each blob to the template exemplar shown in Table 12 below demonstrates results consistent with the findings of distance between functional centers comparisons.

TABLE 12

Mean Percentage of Functional Blob Overlaps with Target Functional Site

| Registration Type | Memory | Left Motorstrip | Right Motorstrip |
|---|---|---|---|
| Arterial | 66.7 ± 21.3 | 41.8 ± 14.7 | 44.8 ± 16.3 |
| Anatomical | 58.1 ± 31.0 | 19.8 ± 22.8 | 20.0 ± 23.2 |

Each functional cluster shows a significantly larger connective overlap resulting from artery alignment. In addition to superior mean coverage for each blob, the standard deviation for each indicates a minimized variance for all blobs relative to the target. This may imply a tighter general clustering of neural activations across all subjects.

d. Discussion

Preliminary results of the 10-subject fMRI study support the hypothesis of improved function localization achieved through alignment of vascular structures as compared with registration of tissue anatomy. The tighter clustering of functional centers and the more extensive overlapping of extracted activation blobs both indicate a greater correspondence of functional activation sites based on blood vessel correlation. The measurement of radial distance between centers is potentially vulnerable to misrepresentation, in spite normalizing efforts, as a result of universal scaling effectively compressing the brain structures; however, the relative connectivity and overlapping properties of the functional objects are independent of the scaling factors and therefore provide secondary validation to the functional center results.

The enhanced localization of homologous functional clusters could be the result of improved registration paradigm created by identifying the core tree brain structure and optimizing the simplified vascular branches. Alternatively, this result may ultimately highlight an underlying biological connection between neurons and surrounding blood vessels. It may not be feasible to determine from the small array of experiments described herein whether the improved correspondence results from better engineering parameters or some manifest physiological link; however, it is interesting to note that largest improvement was visible surrounding the pre-frontal memory activation. This is potentially significant as memory function develops after motor skills, during infancy and early adolescence, and well after cardiovascular maturation. For future work, it is important to enhance spatial precision of the functional sites by creating more focused imaging tasks and by possibly incorporating some of newer functional imaging techniques, such as diffusion coefficient-based contrasts, which will allow for stronger estimation of functional correspondence. Also, developing tools for vascular registration of branches and subtrees should allow for localized alignment based on regions of particular interest. This should permit tighter correlation of individual functional regions based on local registrations.

While the preliminary results of a small sample set certainly may not prove biological connections between the brains neural network and vascular architecture, they certainly do favor assertions in this area. Regardless, the finds of this study demonstrate the potential benefit of the incorporation of vascular information into traditional registration techniques to achieve tighter correspondence of functional activations across individuals. This improvement will surely benefit future neurological work, both clinically and in research.

Application of Blood Vessel Attribute Analysis Methods to Non-Human Subjects

1. Generally

Although the examples described above relate primarily to application of blood vessel statistical analysis to human subjects, the present invention is not limited to performing statistical analysis of blood vessel attributes in human subjects. As stated above in the Summary of the Invention section, the methods described herein can be applied to any organism having a vasculature system. The steps of developing a vasculature atlas for an anatomical region of interest in a particular species and using the atlas to determine the likelihood of normality or abnormality of a subject can be applied to any species having a vasculature system. For example, using z scores or the number of standard deviations that an individual subject's vasculature attributes vary from those in the atlas, it can be determined whether the individual subject's vasculature differs in a statistically significant manner from the normal vasculature represented by the atlas.

2. Statistical Analysis of Blood Vessel Attributes in Mice

One particular species for which the method and systems described herein may be used to analyze blood vessel attributes is mice. Genetically engineered mice are used in clinical research to evaluate various forms of therapy that might ultimately be applied to humans. In one example, mice are genetically engineered to have a particular type of tumor and are used to evaluate different tumor treatments. Vascular attribute analysis can be used to determine tumor grades in these types of mice and evaluate therapy over time without requiring that the mice be sacrificed.

a. Mouse Tumor and Vessel Imaging

Mouse vessels are small. Since the methods, systems, and computer program products described herein require a high level of vascular detail, high resolution imaging techniques must be used in order to statistically analyze mouse vascular attributes. Any of the resolution techniques described above, such as MR, ultrasound, CT, or confocal microscopy imaging can be used image vessels. Image enhancing agents, such as microcrystalline iron oxide nanoparticles (MION) or gadnolinium may be used to enhance vascular images of mice.

b. Image Segmentation and Registration

Segmentation and registration for mice may be performed using the same methods described above for human patients. That is, segmentation may be performed using the methods described in the above-referenced '816 patent to Aylward et al. Registration may be performed by registering the vasculature alone of the mice or based on the corresponding tissue. In one exemplary implementation where brain tumors in mice were being analyzed, registration was performed based on the brains alone. The transformation used in registering different members of a mouse population can be rigid, affine, or fully deformable.

c. Mouse Normal Database

As with humans, determining whether a particular subject is abnormal or normal requires creation of an atlas. In a preferred embodiment, the atlas contains vessel attributes for a plurality of mice in the same statistical population. For example, an atlas may be developed that includes statistical measures of the vasculature of healthy mice or mice having a particular type or grade of tumor. The mice used to generate a particular atlas are preferably of similar age to reduce the influence of age on variability of the vasculature being analyzed. The images of mouse vasculatures used to form the atlas may be mapped to the image of a target mouse that is a member of the population or to a central image, as described above. Different atlases or databases may be developed for mice of different ages.

d. Vessel Attributes

The vessel attributes used to analyze abnormality or normality in mice may be the same attributes described above for humans. For example, tortuosity, vessel volume, lesion volume, vessel density, and vessel radius may be used. These measures may be calculated for a mouse whose vasculature is being analyzed and compared to the measures in the corresponding atlas. If the comparison results in a low z-score value, the mouse may be determined to have the same characteristics as the mice used to form the atlas. If the result of the comparison is a high z-score value, the mouse may be determined to have a characteristic that is different from the mice in the atlas.

IV. Conclusions

Thus, the methods, systems, and computer program products described herein for blood vessel attribute analysis may be used to statistically analyze the vasculature of a subject as compared to an atlas or database of subjects having a particular physical characteristic. The methods, systems, and computer program products described herein also include various techniques for generating a vascular atlas. Using the atlas and statistical measures, such as z scores, individual subjects can be nonintrusively evaluated for purposes of disease diagnosis, disease staging, treatment evaluation, and surgical planning.

All of the publications referenced herein are hereby incorporated herein by reference in their entireties.

It will be understood that various details of the subject matter disclosed herein may be changed without departing from the scope of the subject. Furthermore, the foregoing description is for the purpose of illustration only, and not for the purpose of limitation.

What is claimed is:

1. A method for analyzing blood vessel attributes, the method comprising:
   (a) developing an atlas including at least one blood vessel attribute from blood vessel image data from a population including a plurality of different individuals, wherein developing an atlas includes developing a map of the at least one blood vessel attribute for the population, each location in the map indicating a statistical value of the at least one blood vessel attribute for the population, wherein developing an atlas of blood vessel attributes includes registering blood vessel image data for the different individuals to a template, wherein the template represents an average of blood vessel image data for the individuals;
   (b) obtaining blood vessel attribute measurements for an individual subject;
   (c) comparing the individual subject's blood vessel attribute measurements to the atlas, wherein comparing the individual subject's blood vessel attribute measurements to the atlas includes comparing a map of the at least one blood vessel attribute for the individual to the statistical values at corresponding locations in the atlas; and
   (d) based on the comparison, determining a physical characteristic of the individual subject.

2. The method of claim 1 wherein the blood vessel attributes include three-dimensional blood vessel attributes.

3. The method of claim 2 wherein the three-dimensional blood vessel attributes include at least one of tortuosity, density, count of terminal branches, vessel radius, and ratio of vessel volume to tumor volume.

4. The method of claim 1 wherein obtaining blood vessel attribute measurements from an individual subject includes:
   (a) obtaining blood vessel image data for the individual subject; and
   (b) segmenting the blood vessel image data for the individual subject.

5. A method for analyzing blood vessel attributes, the method comprising:
   (a) developing an atlas including at least one blood vessel attribute from blood vessel image data from a population including a plurality of different individuals, wherein developing an atlas includes developing a map of the at least one blood vessel attribute for the population, each location in the map indicating a statistical value of the at least one blood vessel attribute for the population;
   (b) obtaining blood vessel attribute measurements for an individual subject, wherein obtaining blood vessel attribute measurements from an individual subject includes:

(a) obtaining blood vessel image data for the individual subject; and
(b) segmenting the blood vessel image data for the individual subject;
(c) comparing the individual subject's blood vessel attribute measurements to the atlas, wherein comparing the individual subject's blood vessel attribute measurements to the atlas includes comparing a map of the at least one blood vessel attribute for the individual to the statistical values at corresponding locations in the atlas, wherein comparing the individual subject's blood vessel attribute measurements to the atlas includes registering the segmented blood vessel image data for the subject with the atlas and computing z-score values comparing the individual subject's blood vessel image data with corresponding data in the atlas; and
(d) based on the comparison, determining a physical characteristic of the individual subject.

6. A method for analyzing blood vessel attributes, the method comprising:
(a) developing an atlas including at least one blood vessel attribute from blood vessel image data from a population including a plurality of different individuals, wherein developing an atlas includes developing a map of the at least one blood vessel attribute for the population, each location in the map indicating a statistical value of the at least one blood vessel attribute for the population;
(b) obtaining blood vessel attribute measurements for an individual subject, wherein obtaining blood vessel attribute measurements from an individual subject includes:
  (a) obtaining blood vessel image data for the individual subject; and
  (b) segmenting the blood vessel image data for the individual subject;
(c) comparing the individual subject's blood vessel attribute measurements to the atlas, wherein comparing the individual subject's blood vessel attribute measurements to the atlas includes comparing a map of the at least one blood vessel attribute for the individual to the statistical values at corresponding locations in the atlas, wherein comparing the individual subject's blood vessel attribute measurements to the atlas includes registering the segmented blood vessel image data for the subject with the atlas and computing z-score values comparing the individual subject's blood vessel image data with corresponding data in the atlas, wherein computing z-score values includes computing voxel-by-voxel z-score values for the individual subject's blood vessel image data; and
(d) based on the comparison, determining a physical characteristic of the individual subject.

7. A method for analyzing blood vessel attributes, the method comprising:
(a) developing an atlas including at least one blood vessel attribute from blood vessel image data from a population including a plurality of different individuals, wherein developing an atlas includes developing a map of the at least one blood vessel attribute for the population, each location in the map indicating a statistical value of the at least one blood vessel attribute for the population, wherein the population includes randomly-selected individuals;
(b) obtaining blood vessel attribute measurements for an individual subject;
(c) comparing the individual subject's blood vessel attribute measurements to the atlas, wherein comparing the individual subject's blood vessel attribute measurements to the atlas includes comparing a map of the at least one blood vessel attribute for the individual to the statistical values at corresponding locations in the atlas; and
(d) based on the comparison, determining a physical characteristic of the individual subject.

8. The method of claim 1 wherein the population includes individuals having a particular pathology.

9. The method of claim 1 wherein determining a physical characteristic of the subject includes determining whether the subject has a particular disease.

10. The method of claim 1 wherein determining a physical characteristic of the individual subject includes determining whether the individual subject has a tumor.

11. The method of claim 1 wherein determining a physical characteristic of the individual subject includes identifying the stage of a disease for the individual subject.

12. The method of claim 11 wherein identifying a stage of a disease for the individual subject includes identifying a tumor grade for the individual subject.

13. The method of claim 1 wherein determining a physical characteristic of the individual subject includes evaluating the individual subject's response to medical treatment.

14. The method of claim 1 wherein determining a physical characteristic of the individual subject includes identifying the location of an abnormality in the individual subject.

15. The method of claim 1 wherein determining a physical characteristic of the individual subject includes identifying the location of a functional site in the individual subject's brain.

16. The method of claim 1 wherein the individual subject comprises a human subject.

17. The method of claim 1 wherein the individual subject includes a non-human subject having a vasculature system.

18. A system for analyzing blood vessel attributes, the system comprising:
(a) an atlas of blood vessel anatomy, the atlas including a map of at least one blood vessel attribute developed from in vivo blood vessel image data from a population including a plurality of different individuals, each location in the map indicating a statistical value of the at least one blood vessel attribute for the population developed by registering blood vessel image data for the different individuals to a template, wherein the template represents an average of blood vessel image data for the individuals;
(b) an attribute measurement module for obtaining a blood vessel attribute measurement for an individual subject;
(c) an individual subject attribute comparator for comparing the individual subject's blood vessel attribute measurements to the atlas, wherein comparing an individual subject's blood vessel attribute measurements to the atlas includes comparing a map of the at least one blood vessel attribute for the individual to the statistical values at corresponding locations in the atlas; and
(d) an output module for outputting results of the comparison, wherein the results of the comparison indicate a physical characteristic of the individual subject and wherein at least one of the atlas, the attribute measurement module, the comparator, and the output module is embodied in a non-transitory computer readable medium.

19. The system of claim 18 wherein the at least one blood vessel attribute includes at least one of tortuosity, vascular density, count of terminal branches, blood vessel radius, and ratio of blood vessel volume to tumor volume calculated for the population.

20. The system of claim 19 wherein the statistical values in the atlas are computed on a voxel-by-voxel basis for the blood vessel image data from the population.

21. The system of claim 20 wherein the statistical value includes a mean and a standard deviation for the blood vessel attribute at each voxel.

22. The system of claim 21 wherein the individual subject comparator is adapted to compare the individual subject's blood vessel attribute measurement at each voxel in the blood vessel image data with the mean and standard deviation blood vessel image data for each voxel in the atlas.

23. The system of claim 22 wherein the individual subject attribute comparator is adapted to output a z score for each voxel, indicating the number of standard deviations that the individual subject's blood vessel attribute data differs from the corresponding blood vessel attribute data in the atlas.

24. The system of claim 18 wherein the output module is adapted to output an indicator of whether the individual subject has a particular pathology.

25. The system of claim 24 wherein the indicator comprises a z-score value.

26. The system of claim 18 wherein the output module is adapted to output a map of z-score values indicating how blood vessel attributes in corresponding regions of the blood vessel image data for the individual subject compare to the blood vessel attribute in the atlas.

27. A non-transitory computer readable medium having stored thereon computer executable instructions that when executed by the processor of a computer perform steps comprising:
   (a) developing an atlas including at least one blood vessel attribute from in vivo blood vessel image data from a population including a plurality of different individuals, wherein developing an atlas includes developing a map of the at least one blood vessel attribute for the population, each location in the map indicating a statistical value of the at least one blood vessel attribute for the population, wherein developing an atlas of blood vessel attributes includes registering blood vessel image data for the different individuals to a template, wherein the template represents an average of blood vessel image data for the individuals;
   (b) obtaining blood vessel attribute measurements for an individual subject;
   (c) comparing the individual subject's blood vessel attribute measurements to the atlas, wherein comparing an individual subject's blood vessel attribute measurements to the atlas includes comparing a map of the at least one blood vessel attribute for the individual to the statistical values at corresponding locations in the atlas; and
   (d) based on the comparison, determining a physical characteristic of the individual subject.

28. The non-transitory computer program product of claim 27 wherein developing an atlas of blood vessel attributes includes registering blood vessel image data for the different individuals with a template using a rigid transformation.

29. The non-transitory computer program product of claim 27 wherein developing an atlas of blood vessel attributes includes registering blood vessel image data for the different individuals with a template using an affine transformation.

30. The non-transitory computer program product of claim 27 wherein developing an atlas of blood vessel attributes includes registering blood vessel image data for the different individuals with a template using a fully deformable transformation.

31. The non-transitory computer program product of claim 27 wherein developing an atlas of blood vessel attributes includes registering blood vessel image data of the different individuals to a template model using tissue-based registration.

32. The non-transitory computer program product of claim 27 wherein developing an atlas of blood vessel attributes includes registering blood vessel image data of the different individuals to a template model using vessel-based registration.

33. The non-transitory computer program product of claim 27 wherein developing an atlas of blood vessel attributes includes registering blood vessel image data for the different individuals to a template, wherein the template is based on blood vessel image data for one of the individuals.

34. The non-transitory computer program product of claim 27 wherein developing an atlas of blood vessel attributes includes registering blood vessel image data for the different individuals to a template, wherein the template represents an average of blood vessel image data for the individuals.

35. The non-transitory computer program product of claim 27 wherein the blood vessel attributes include three-dimensional blood vessel attributes.

36. The non-transitory computer program product of claim 35 wherein the three-dimensional blood vessel attributes include at least one of tortuosity, density, count of terminal branches, vessel radius, and ratio of vessel volume to tumor volume.

37. The non-transitory computer program product of claim 27 wherein obtaining blood vessel attribute measurements from an individual subject includes:
   (a) obtaining blood vessel image data for the individual subject; and
   (b) segmenting the blood vessel image data for the individual subject.

38. The non-transitory computer program product of claim 27 wherein comparing the individual subject's blood vessel attribute measurements to the atlas includes registering the segmented blood vessel image data for the subject with the atlas and computing z-score values comparing the individual subject's blood vessel image data with corresponding data in the atlas.

39. The non-transitory computer program product of claim 38 wherein computing z-score values includes computing voxel-by-voxel z-score values for the individual subject's blood vessel image data.

40. The non-transitory computer program product of claim 27 wherein the population includes randomly-selected individuals.

41. The non-transitory computer program product of claim 27 wherein the population includes individuals having a particular pathology.

42. The non-transitory computer program product of claim 27 wherein determining a physical characteristic of the subject includes determining whether the subject has a particular disease.

43. The non-transitory computer program product of claim 27 wherein determining a physical characteristic of the individual subject includes determining whether the individual subject has a tumor.

44. The non-transitory computer program product of claim 27 wherein determining a physical characteristic of the individual subject includes identifying the stage of a disease for the individual subject.

45. The non-transitory computer program product of claim 44 wherein identifying a stage of a disease for the individual subject includes identifying a tumor grade for the individual subject.

46. The non-transitory computer program product of claim 27 wherein determining a physical characteristic of the individual subject includes evaluating the individual subject's response to medical treatment.

47. The non-transitory computer program product of claim 27 wherein determining a physical characteristic of the individual subject includes identifying the location of an abnormality in the individual subject.

48. The non-transitory computer program product of claim 27 wherein determining a physical characteristic of the individual subject includes identifying the location of a functional site in the individual subject's brain.

49. The non-transitory computer program product of claim 27 wherein the individual subject comprises a human subject.

50. The non-transitory computer program product of claim 27 wherein the individual subject includes a non-human subject having a vasculature system.

51. The method of claim 1 wherein developing an atlas of blood vessel attributes includes registering blood vessel image data for the different individuals with a template using a rigid transformation.

52. The method of claim 1 wherein developing an atlas of blood vessel attributes includes registering blood vessel image data for the different individuals with a template using an affine transformation.

53. The method of claim 1 wherein developing an atlas of blood vessel attributes includes registering blood vessel image data for the different individuals with a template using a fully deformable transformation.

54. The method of claim 1 wherein developing an atlas of blood vessel attributes includes registering blood vessel image data of the different individuals to a template model using tissue-based registration.

55. The method of claim 1 wherein developing an atlas of blood vessel attributes includes registering blood vessel image data of the different individuals to a template model using vessel-based registration.

56. The method of claim 1 wherein developing an atlas of blood vessel attributes includes registering blood vessel image data for the different individuals to a template, wherein the template is based on blood vessel image data for one of the individuals.

* * * * *